United States Patent
Qin et al.

(10) Patent No.: US 11,258,563 B2
(45) Date of Patent: Feb. 22, 2022

(54) SOUNDING REFERENCE SIGNAL SENDING AND RECEIVING METHOD, APPARATUS, AND NON-TRANSITORY COMPUTER-READABLE MEDIUM

(71) Applicant: Huawei Technologies Co., Ltd., Shenzhen (CN)

(72) Inventors: Yi Qin, Kista (SE); Binbin Zhang, Chengdu (CN); Zhongfeng Li, Shanghai (CN); Min Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/991,865

(22) Filed: Aug. 12, 2020

(65) Prior Publication Data

US 2020/0374074 A1 Nov. 26, 2020

Related U.S. Application Data

(63) Continuation of application No. 16/654,797, filed on Oct. 16, 2019, now Pat. No. 10,771,219, which is a
(Continued)

(30) Foreign Application Priority Data

Nov. 17, 2017 (CN) .......................... 201711148344.7

(51) Int. Cl.
*H04L 5/00* (2006.01)
*H04W 72/04* (2009.01)
(Continued)

(52) U.S. Cl.
CPC .......... *H04L 5/0048* (2013.01); *H04L 5/0042* (2013.01); *H04L 5/0058* (2013.01);
(Continued)

(58) Field of Classification Search
CPC ... H04L 5/0048; H04L 5/0094; H04L 5/0058; H04L 5/0078; H04L 5/0042;
(Continued)

(56) References Cited

U.S. PATENT DOCUMENTS 10,771,219 B2 * 9/2020 Qin ..................... H04W 72/044
2011/0261716 A1 10/2011 Kim et al.
(Continued)

FOREIGN PATENT DOCUMENTS

CN 101296030 A 10/2008
CN 101540631 A 9/2009
(Continued)

OTHER PUBLICATIONS

SRS antenna switching, 3GPP TSG RAN WG1 Meeting #90bis, Prague, Czech Republic, R1-1718246, pp. 1-7, 3rd Generation Partnership Project, Valbonne, France (Oct. 9-13, 2017).
(Continued)

*Primary Examiner* — Joshua Kading
(74) *Attorney, Agent, or Firm* — Leydig, Voit & Mayer, Ltd.

(57) ABSTRACT

A signal sending and receiving method includes: receiving, by a terminal device, at least one piece of resource configuration information for determining N reference signal resource groups, and each of the N reference signal resource groups includes at least one reference signal resource; and sending a reference signal on a resource in an $i^{th}$ reference signal resource group in the N reference signal resource groups by using a $j^{th}$ antenna group corresponding to the $i^{th}$ reference signal resource group, where the $j^{th}$ antenna group includes at least one antenna. The N reference signal resource groups correspond to N antenna groups, and any two of the N antenna groups are different.

12 Claims, 11 Drawing Sheets

Related U.S. Application Data continuation of application No. PCT/CN2018/115905, filed on Nov. 16, 2018.

(51) Int. Cl.
*H04W 72/12* (2009.01)
*H04B 7/06* (2006.01)

(52) U.S. Cl.
CPC .......... *H04L 5/0078* (2013.01); *H04L 5/0091* (2013.01); *H04L 5/0094* (2013.01); *H04W 72/042* (2013.01); *H04W 72/044* (2013.01); *H04W 72/0446* (2013.01); *H04W 72/1268* (2013.01); *H04W 72/1289* (2013.01); *H04B 7/06* (2013.01); *H04L 5/0005* (2013.01)

(58) Field of Classification Search
CPC ... H04L 5/0005; H04L 5/0091; H04L 5/0023; H04W 72/1268; H04W 72/0446; H04W 72/1289; H04W 72/042; H04W 72/044; H04W 74/006; H04B 7/06
See application file for complete search history.

(56) References Cited

U.S. PATENT DOCUMENTS

| | | | |
|---|---|---|---|
| 2012/0287882 A1* | 11/2012 | Kim | H04L 5/0048 370/329 |
| 2013/0329660 A1 | 12/2013 | Noh | |
| 2016/0156399 A1 | 6/2016 | Chen et al. | |
| 2017/0290041 A1 | 10/2017 | Alvarino et al. | |
| 2017/0374664 A1 | 12/2017 | Kimura et al. | |
| 2019/0052328 A1 | 2/2019 | Akula et al. | |
| 2019/0132838 A1 | 5/2019 | Yi et al. | |
| 2019/0349972 A1 | 11/2019 | Nam et al. | |

FOREIGN PATENT DOCUMENTS

| | | |
|---|---|---|
| CN | 103220066 A | 7/2013 |
| CN | 104333407 A | 2/2015 |
| CN | 104335499 A | 2/2015 |
| CN | 104639223 A | 5/2015 |
| CN | 105991264 A | 10/2016 |
| CN | 106470096 A | 3/2017 |
| EP | 2673909 B1 | 2/2019 |
| JP | 2012114901 A | 6/2012 |
| JP | 2012514375 A | 6/2012 |
| KR | 101651687 B1 | 8/2016 |
| WO | 2017056796 A1 | 4/2017 |
| WO | 2017167010 A1 | 10/2017 |
| WO | 2017173216 A1 | 10/2017 |

OTHER PUBLICATIONS

WF on SRS for NR, 3GPP TSG RAN WG1 Meeting #90b, Prague, Czech Republic, R1-1718968, pp. 1-15, 3rd Generation Partnership Project, Valbonne, France (Oct. 9-13, 2017).

3rd Generation Partnership Project; Technical Specification Group Radio Access Network; NR; Physical layer procedures for data (Release 15), 3GPP TS 38.214 V1 .0.0, pp. 1-32, 3rd Generation Partnership Project, France (Sep. 2017).

U.S. Appl. No. 16/654,797, filed Oct. 16, 2019.

U.S. Appl. No. 16/941,210, filed Jul. 28, 2020.

Huawei et al., "SRS antenna switching," 3GPP TSG RAN WG1 Meeting #90bis, Prague, Czech Republic, R1-1718246, total 7 pages, 3rd Generation Partnership Project, Valbonne, France (Oct. 9-13, 2017).

Qualcomm Incorporated, "Remaining details on SRS," 3GPP TSG RAN WG1 Meeting 90bis, Prague, CZ, R1-1718549, total 9 pages, 3rd Generation Partnership Project, Valbonne, France (Oct. 9-13, 2017).

"Remaining details on SRS," 3GPP TSG RAN WG1 Meeting 90bis, Prague, CZ, R1-1718549, pp. 1-9, 3rd Generation Partnership Project, Valbonne, France (Oct. 9-13, 2017).

* cited by examiner

SOUNDING REFERENCE SIGNAL SENDING AND RECEIVING METHOD, APPARATUS, AND NON-TRANSITORY COMPUTER-READABLE MEDIUM

CROSS-REFERENCE TO RELATED APPLICATIONS

This application is a continuation of U.S. application Ser. No. 16/654,797, filed on Oct. 16, 2019, which is a continuation of International Application No. PCT/CN2018/115905, filed on Nov. 16, 2018, which claims priority to Chinese Patent Application No. 201711148344.7, filed on Nov. 17, 2017. All of the aforementioned patent applications are hereby incorporated by reference in their entireties.

TECHNICAL FIELD

This application relates to the wireless communications field, and more specifically, to a signal sending and receiving method, apparatus, and system.

BACKGROUND

A sounding reference signal (SRS) is a reference signal used to measure an uplink channel. A network device may measure an uplink channel based on an SRS sent by a terminal device, to obtain channel state information (CSI) of the uplink channel, to schedule an uplink resource.

In some cases, the terminal device needs to send an SRS in an antenna switching manner. For example, in some systems characterized by channel reciprocity, the network device may estimate CSI of a downlink channel by using the CSI of the uplink channel obtained by measuring the uplink channel, to schedule a downlink resource. However, if a quantity of uplink antennas configured for the terminal device is less than a quantity of downlink antennas, the terminal device needs to switch a plurality of antennas to send a plurality of SRSs, so that the network device obtains CSI of a plurality of downlink channels.

Currently, in a current method, the terminal device may calculate a to-be-switched antenna based on each transmit opportunity of a reference signal. However, this method is strongly correlated with a transmission period of the reference signal, and has a limitation to some extent. For example, in some systems such as a 5G new radio access technology (NR) system, because transmission of some SRSs is not periodic, the terminal device cannot determine a to-be-switched antenna based on a transmission period, and therefore cannot perform antenna switching.

SUMMARY

This application provides a signal sending and receiving method, apparatus, and system, so as to perform antenna switching based on a correspondence between a reference signal resource group and an antenna group, and improve performance of a terminal device.

According to a first aspect, a signal sending method is provided, including:

receiving, by a terminal device, at least one piece of resource configuration information, where the at least one piece of resource configuration information is used to determine N reference signal resource groups, and each of the N reference signal resource groups includes at least one reference signal resource; and sending, by the terminal device, a reference signal on a resource in an $i^{th}$ reference signal resource group in the N reference signal resource groups by using a $j^{th}$ antenna group corresponding to the $i^{th}$ reference signal resource group, where the $j^{th}$ antenna group includes at least one antenna, where at least two of the N reference signal resource groups occupy different first-type time units, the N reference signal resource groups correspond to N antenna groups, and at least two of the N antenna groups are different, where $1 \leq i \leq N$, $1 \leq j \leq N$, i and j are integers, and N is an integer greater than or equal to 2.

Therefore, the terminal device in this embodiment of this application may determine a corresponding antenna group based on a reference signal resource group, send a reference signal on the reference signal resource group based on the antenna group, and flexibly perform antenna switching based on a correspondence between a plurality of reference signal resource groups and a plurality of antenna groups. In comparison with the prior art, antenna switching can be decoupled from a transmission period, and this embodiment is applicable to reference signal transmission in various possible manners, thereby improving performance of the terminal device.

Optionally, the N reference signal resource groups are in a one-to-one correspondence with the N antenna groups.

In an embodiment, the terminal device receives at least one piece of resource configuration information, where the at least one piece of resource configuration information is used to determine N reference signal resources; and the terminal device sends a reference signal on an $i^{th}$ reference signal resource in the N reference signal resources by using a $j^{th}$ antenna group corresponding to the $i^{th}$ reference signal resource, where the $j^{th}$ antenna group includes at least one antenna. At least two of the N reference signal resources occupy different first-type time units, the N reference signal resources correspond to N antenna groups, and at least two of the N antenna groups are different, where $1 \leq i \leq N$, $1 \leq j \leq N$, i and j are integers, and N is an integer greater than or equal to 2.

With reference to the first aspect, in some implementations of the first aspect, the method further includes:

determining, by the terminal device according to a predefined rule, the $j^{th}$ antenna group corresponding to the $i^{th}$ reference signal resource group.

In other words, the $j^{th}$ antenna group corresponding to the $i^{th}$ reference signal resource group may be determined by the terminal device according to the predefined rule.

Optionally, the terminal device determines, based on an identifier of the reference signal resource and an identifier of the antenna, the $j^{th}$ antenna group corresponding to the $i^{th}$ reference signal resource group.

With reference to the first aspect, in some implementations of the first aspect, the method further includes:

receiving, by the terminal device, at least one piece of antenna configuration information, where the antenna configuration information is used to indicate a correspondence between the N antenna groups and the N reference signal resource groups; and determining, by the terminal device based on the correspondence between the N antenna groups and the N reference signal resource groups, the $j^{th}$ antenna group corresponding to the $i^{th}$ reference signal resource group.

In other words, the correspondence between the N reference signal resource groups and the N antenna groups may be configured by a network device, and is notified to the terminal device by using signaling, so that the terminal device determines the $j^{th}$ antenna group corresponding to the $i^{th}$ reference signal resource group.

With reference to the first aspect, in some implementations of the first aspect, the method further includes:

receiving, by the terminal device, a plurality of pieces of first information, where each piece of first information is used to indicate whether a reference signal to be transmitted on one reference signal resource is to be sent in an antenna switching manner or whether the reference signal is used to measure a channel for antenna selection; or receiving, by the terminal device, at least one piece of first information, where each piece of first information is used to indicate whether reference signals to be transmitted on all reference signal resources in a reference signal resource set to which one reference signal resource belongs are to be sent in an antenna switching manner or whether the reference signals are used to measure a channel for antenna selection, and the reference signal resource set includes at least one of the N reference signal resource groups; or receiving, by the terminal device, at least one piece of first information, where each piece of first information is used to indicate whether reference signals to be transmitted on all reference signal resources in one reference signal resource set are to be sent in an antenna switching manner or whether the reference signals are used to measure a channel for antenna selection, and the reference signal resource set includes at least one of the N reference signal resource groups; or receiving, by the terminal device, one piece of first information, where the first information is used to indicate whether all reference signals of the terminal device are to be sent in an antenna switching manner or whether all the reference signals are used to measure a channel for antenna selection.

In other words, the network device may indicate, to the terminal device by using one or more pieces of information based on different granularities (for example, a reference signal resource, a reference signal resource set, or the terminal device), whether a reference signal to be transmitted on a reference signal resource is to be sent in an antenna switching manner, so that the terminal device performs antenna switching based on configuration of the network device.

With reference to the first aspect, in some implementations of the first aspect, a time interval between at least two of the N reference signal resource groups is greater than or equal to Y second-type time units, where Y is an integer greater than or equal to 0.

Y may be understood as a quantized value of a guard period between resource groups. In this embodiment of this application, a time interval between two reference signal resource groups is specified, so as to avoid a problem that signal quality of some symbols may deteriorate due to a very short time domain distance between different signals. Therefore, signal receiving quality is improved, and performance of the terminal device is improved.

Optionally, a time interval between any two of the N reference signal resource groups is greater than or equal to Y second-type time units.

Optionally, the second-type time unit is a symbol, and a time interval between any two of the N reference signal resources is greater than or equal to Y symbols.

With reference to the first aspect, in some implementations of the first aspect, a value range of Y is determined based on at least one of the following: a carrier frequency of a frequency domain resource used by the terminal device to send a reference signal and a subcarrier spacing used by the terminal device to send a reference signal.

In other words, the value range of Y may be predefined, for example, the value range of Y is defined by a protocol. In addition, a value of Y may be determined based on frequency bands of bandwidth parts (BWPs) of different terminal devices and frequency bands of different component carriers (CCs).

Optionally, a value of Y is determined based on a subcarrier spacing that is used by the terminal device to send a reference signal.

Optionally, when the subcarrier spacing is one of 15 kilohertz kHz, 30 kHz, or 60 kHz, the value of Y is 1, and/or when the subcarrier spacing is 120 kHz, the value of Y is 2.

With reference to the first aspect, in some implementations of the first aspect, the method further includes:

sending, by the terminal device, third information, where the third information carries a reference value of a time interval needed by the terminal device, or the first information carries a minimum value of a time interval needed by the terminal device.

The time interval needed by the terminal device may also be understood as a guard period. In this embodiment of this application, the terminal device reports the reference value or the minimum value of the needed time interval to the network device, so that a guard period configured by the network device for the terminal device is more suitable for the terminal device, and signal quality is improved.

With reference to the first aspect, in some implementations of the first aspect, the method further includes:

receiving, by the terminal device, fourth information, where the fourth information carries the value of Y.

The value of Y is indicated to the terminal device, so that when performing rate matching or sending a PDCCH, the terminal device can perform resource mapping based on a guard period, so as to avoid a problem that signal quality of some symbols may deteriorate due to a very short time domain distance between resources. Therefore, signal receiving quality is improved, and performance of the terminal device is improved.

According to a second aspect, a signal receiving method is provided, including:

sending, by a network device, at least one piece of resource configuration information, where the at least one piece of resource configuration information is used to determine N reference signal resource groups, and each of the N reference signal resource groups includes at least one reference signal resource; and receiving, by the network device, a reference signal from a $j^{th}$ antenna group on a resource in an $i^{th}$ reference signal resource group in the N reference signal resource groups, where the $j^{th}$ antenna group includes at least one antenna, where at least two of the N reference signal resource groups occupy different first-type time units, the N reference signal resource groups correspond to N antenna groups, and at least two of the N antenna groups are different, where $1 \leq i \leq N$, $1 \leq j \leq N$, i and j are integers, and N is an integer greater than or equal to 2.

Therefore, a terminal device in this embodiment of this application may determine a corresponding antenna group based on a reference signal resource group, send a reference signal on the reference signal resource group based on the antenna group, and flexibly perform antenna switching based on a correspondence between a plurality of reference signal resource groups and a plurality of antenna groups. In comparison with the prior art, antenna switching can be decoupled from a transmission period, and this embodiment is applicable to reference signal transmission in various possible manners, thereby improving performance of the terminal device.

Optionally, the N reference signal resource groups are in a one-to-one correspondence with the N antenna groups.

In an embodiment, the network device sends at least one piece of resource configuration information, where the at least one piece of resource configuration information is used to determine N reference signal resources; and the network device receives a reference signal from a $j^{th}$ antenna group on an $i^{th}$ reference signal resource in the N reference signal resources, where the $j^{th}$ antenna group includes at least one antenna. At least two of the N reference signal resources occupy different first-type time units, the N reference signal resources correspond to N antenna groups, and at least two of the N antenna groups are different, where 1≤i≤N, 1≤j≤N, i and j are integers, and N is an integer greater than or equal to 2.

With reference to the second aspect, in some implementations of the second aspect, the method further includes:
sending, by the network device, at least one piece of antenna configuration information, where the antenna configuration information is used to indicate a correspondence between the N antenna groups and the N reference signal resource groups.

In other words, the correspondence between the N reference signal resource groups and the N antenna groups may be configured by the network device, and is notified to the terminal device by using signaling, so that the terminal device determines the $i^{th}$ antenna group corresponding to the $i^{th}$ reference signal resource group.

With reference to the second aspect, in some implementations of the second aspect, the method further includes:
sending, by the network device, a plurality of pieces of first information, where each piece of first information is used to indicate whether a reference signal on one reference signal resource is to be sent in an antenna switching manner or whether the reference signal is used to measure a channel for antenna selection; or
sending, by the network device, at least one piece of first information, where each piece of first information is used to indicate whether a reference signal to be transmitted on the reference signal resource in a reference signal resource set to which one reference signal resource belongs is to be sent in an antenna switching manner or whether the reference signal is used to measure a channel for antenna selection, and the reference signal resource set includes at least one of the N reference signal resource groups; or
sending, by the network device, at least one piece of first information, where each piece of first information is used to indicate whether reference signals to be transmitted on all reference signal resources in one reference signal resource set are to be sent in an antenna switching manner or whether the reference signals are used to measure a channel for antenna selection, and the reference signal resource set includes at least one of the N reference signal resource groups; or
sending, by the network device, one piece of first information, where the first information is used to indicate whether all reference signals of the terminal device are to be sent in an antenna switching manner or whether all the reference signals are used to measure a channel for antenna selection.

In other words, the network device may indicate, to the terminal device by using one or more pieces of information based on different granularities (for example, a reference signal resource, a reference signal resource set, or the terminal device), whether a reference signal to be transmitted on a reference signal resource is to be sent in an antenna switching manner, so that the terminal device performs antenna switching based on configuration of the network device.

With reference to the second aspect, in some implementations of the second aspect, a time interval between at least two of the N reference signal resource groups is greater than or equal to Y second-type time units, where Y is an integer greater than or equal to 0.

Y may be understood as a quantized value of a guard period between resource groups. In this embodiment of this application, a time interval between two reference signal resource groups is specified, so as to avoid a problem that signal quality of some symbols may deteriorate due to a very short time domain distance between different signals. Therefore, signal receiving quality is improved, and performance of the terminal device is improved.

Optionally, a time interval between any two of the N reference signal resource groups is greater than or equal to Y second-type time units.

Optionally, the second-type time unit is a symbol, and a time interval between any two of the N reference signal resources is greater than or equal to Y symbols.

With reference to the second aspect, in some implementations of the second aspect, a value range of Y is determined based on at least one of the following: a carrier frequency of a frequency domain resource used by the terminal device to send a reference signal and a subcarrier spacing used by the terminal device to send a reference signal.

In other words, the value range of Y may be predefined, for example, the value range of Y is defined by a protocol. In addition, a value of Y may be determined based on frequency bands of BWPs of different terminal devices and frequency bands of different CCs.

Optionally, a value of Y is determined based on a subcarrier spacing that is used by the terminal device to send a reference signal.

Optionally, when the subcarrier spacing is one of 15 kilohertz kHz, 30 kHz, or 60 kHz, the value of Y is 1, and/or when the subcarrier spacing is 120 kHz, the value of Y is 2.

With reference to the second aspect, in some implementations of the second aspect, the method further includes:
receiving, by the network device, third information, where the third information carries a reference value of a time interval needed by the terminal device, or the third information carries a minimum value of a time interval needed by the terminal device.

The time interval needed by the terminal device may also be understood as a guard period. In this embodiment of this application, the terminal device reports the reference value or the minimum value of the needed time interval to the network device, so that a guard period configured by the network device for the terminal device is more suitable for the terminal device, and signal quality is improved.

With reference to the second aspect, in some implementations of the second aspect, the method further includes:
sending, by the network device, fourth information, where the fourth information carries the value of Y.

The value of Y is indicated to the terminal device, so that when performing rate matching or sending a PDCCH, the terminal device can perform resource mapping based on a guard period, so as to avoid a problem that signal quality of some symbols may deteriorate due to a very short time domain distance between resources. Therefore, signal receiving quality is improved, and performance of the terminal device is improved.

According to a third aspect, a signal sending method is provided, including:

receiving, by a terminal device, fifth information, where the fifth information indicates a first resource used to send a first signal or a first channel and a second resource used to send a second signal or a second channel; and if a time interval between the first resource and the second resource in time domain is less than Z second-type time units and a part of antennas in a first antenna group corresponding to the first resource and a part of antennas in a second antenna group corresponding to the second resource cannot be used for simultaneous transmission, sending, by the terminal device, the first signal or the first channel on the first resource by using the first antenna group corresponding to the first resource, where a priority of the first signal or the first channel is higher than a priority of the second signal or the second channel, where Z≥0.

Therefore, when the terminal device transmits a signal or a channel by using different antenna groups, it can be ensured that a time interval between different resources is greater than or equal to (or greater than) a time length of a guard period, thereby ensuring signal receiving quality and improving performance of the terminal device.

In this embodiment of this application, the terminal device may process the second signal or the second channel by using any one of the following methods:

Manner A: If at least some antennas in the second antenna group and any one of antennas in the first antenna group can be used for simultaneous transmission, the terminal device sends the second signal or the second channel on the second resource by using at least some antennas in the second antenna group.

Manner B: The terminal device sends the second signal or the second channel on the second resource by using at least some antennas in the first antenna group.

Manner C: If all antennas in the second antenna group and any one of antennas in the first antenna group cannot be used for simultaneous transmission, the terminal device does not send the second signal or the second channel on the second resource.

According to a fourth aspect, a signal sending apparatus is provided, including a receiving unit and a sending unit, to perform the method in the first aspect or the third aspect and any possible implementation of the first aspect or the third aspect. The receiving unit is configured to execute a function related to receiving, and the sending unit is configured to execute a function related to sending.

According to a fifth aspect, a signal sending apparatus is provided, including a processor, a memory, and a transceiver. The memory is configured to store a computer program, and the processor is configured to invoke the computer program from the memory and run the computer program, to control the transceiver to send/receive a signal, so that the apparatus performs the method in the first aspect or the third aspect and any possible implementation of the first aspect or the third aspect.

In a possible design, the signal sending apparatus may be a terminal device.

According to a sixth aspect, a signal receiving apparatus is provided, including a sending unit and a receiving unit, to perform the method in the second aspect or any possible implementation of the second aspect. The sending unit is configured to execute a function related to sending, and the receiving unit is configured to execute a function related to receiving.

According to a seventh aspect, a signal receiving apparatus is provided, including a processor, a memory, and a transceiver. The memory is configured to store a computer program, and the processor is configured to invoke the computer program from the memory and run the computer program, to control the transceiver to send/receive a signal, so that the apparatus performs the method in the second aspect or any possible implementation of the second aspect.

In a possible design, the signal receiving apparatus may be a network device.

According to an eighth aspect, a system is provided, and the system includes the signal sending apparatus in the fourth aspect and the signal receiving apparatus in the sixth aspect, or includes the signal sending apparatus in the fifth aspect and the signal receiving apparatus in the seventh aspect.

According to a ninth aspect, a computer readable storage medium is provided and is configured to store a computer program. The computer program includes an instruction used to perform the method in the foregoing aspects or any possible implementation of the foregoing aspects.

According to a tenth aspect, a computer program product is provided, and the computer program product includes computer program code. When the computer program code runs on a computer, the computer performs the method in the foregoing aspects or any possible implementation of the foregoing aspects.

According to an eleventh aspect, a chip system is provided, and the chip system includes a processor, configured to support a network device in implementing functions in the foregoing aspects, for example, generating, receiving, sending, or processing data and/or information in the foregoing methods. In a possible design, the chip system further includes a memory, and the memory is configured to store a program instruction and data that are necessary for a terminal device. The chip system may include a chip, or may include a chip and another discrete device.

DESCRIPTION OF EMBODIMENTS

The following describes technical solutions in this application with reference to the accompanying drawings.

Technical solutions in embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications System (UMTS), a worldwide interoperability for microwave access (WiMAX) communications system, a future 5th generation (5G) system, or a new radio access technology (NR) system.

Figure 1:
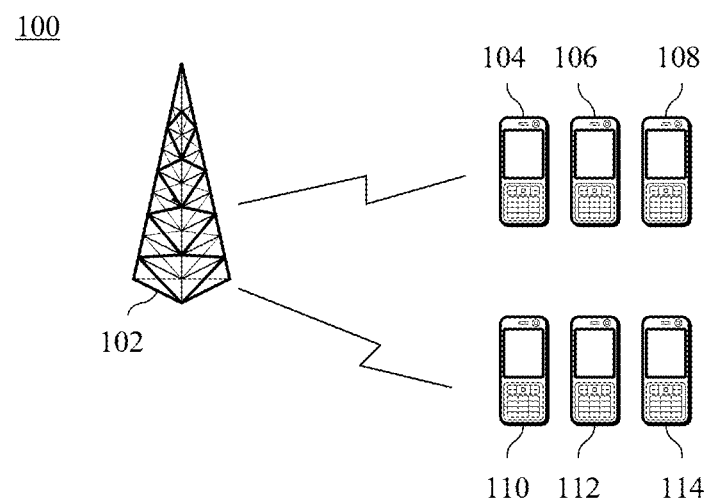
FIG. 1 is a schematic diagram of a communications system to which a communication method in an embodiment of this application is applicable.

To facilitate understanding of embodiments of this application, a communications system to which embodiments of this application are applicable is first described in detail with reference to FIG. 1. FIG. 1 is a schematic diagram of a communications system 100 to which a reference signal transmission and receiving method in an embodiment of this application is applicable. As shown in FIG. 1, the communications system 100 may include a network device 102 and terminal devices 104 to 114.

It should be understood that the network device 102 may be any device having a wireless sending/receiving function or a chip that may be disposed on the device. The device includes but is not limited to a base station (for example, a base station NodeB, an evolved NodeB eNodeB, a network device in a fifth generation (5G) communications system (such as a transmission point (TP), a transmission reception point (TRP), a base station, or a small cell device), a network device in a future communications system, an access node in a wireless fidelity (Wi-Fi) system, a wireless relay node, a wireless backhaul node, and the like.

The network device 102 may communicate with a plurality of terminal devices (for example, the terminal devices 104 to 114 shown in the figure).

It should be understood that the terminal device may also be referred to as a user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in embodiments of this application may be a mobile phone, a tablet computer (such as Pad), a computer with a wireless sending/receiving function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in embodiments of this application. In this application, the foregoing terminal device and the chip that may be disposed on the foregoing terminal device are collectively referred to as a terminal device.

In addition, the communications system 100 may alternatively be a public land mobile network (PLMN) network, a device-to-device (D2D) network, a machine-to-machine (M2M) network, or another network. FIG. 1 is only a simplified schematic diagram of an example for ease of understanding, and the communications system 100 may further include another network device and another terminal device that are not shown in FIG. 1.

To facilitate understanding of embodiments of this application, the following uses downlink data transmission as an example to briefly describe a process of transmitting data by using a multiple-input multiple-output (MIMO) technology.

The network device may determine a precoding matrix based on pre-obtained CSI of a downlink channel, perform precoding on to-be-sent data and a to-be-sent demodulation reference signal (DMRS), and send data and a demodulation reference signal that are obtained after the precoding to the terminal device. The terminal device may perform channel estimation based on the received DMRS to determine an equivalent channel matrix, and then demodulate the data sent by the network device.

In some systems characterized by "uplink and downlink channel reciprocity" such as a WiMAX system or an LTE-TDD system, and a future possible system characterized by "channel reciprocity", the network device may estimate CSI of a downlink channel by using CSI obtained by measuring an uplink channel. Specifically, the network device may measure the uplink channel based on an uplink reference signal (for example, an SRS sent by the terminal device, to obtain the CSI of the uplink channel, and further estimate the CSI of the downlink channel based on the CSI of the uplink channel, for example, including a precoding matrix indicator (PMI), a rank indicator (RI), and a channel quality indicator (CQI).

Herein, it should be noted that in a system with "channel reciprocity", an uplink channel and a downlink channel occupy a same frequency band. Therefore, it may be considered that the uplink channel and the downlink channel are similar, in other words, reciprocal.

With development of a multiple-antenna technology, a plurality of transmit antennas and a plurality of receive antennas may be configured for the network device and the terminal device. A quantity of transmit antennas configured for some terminal devices may be less than a quantity of receive antennas, for example, 1T2R (namely, one transmit antenna and two receive antennas), 2T4R (namely, two transmit antennas and four receive antennas), or aTbR (a<b). It may be understood that in an example of 1T2R, the terminal device can simultaneously transmit an uplink signal/channel by using only one antenna, and can simultaneously receive downlink signal/channel by using two antennas. Therefore, when CSI of a downlink channel needs to be obtained by using channel reciprocity, the terminal device may need to send an SRS/SRSs by using different antennas at different time. This manner may be referred to as antenna switching or antenna selection.

In another possible case, when measuring uplink channels, the terminal device needs to poll the quantity of configured transmit antennas to obtain CSI of each channel, so as to select antennas in a good channel state that can be used for simultaneous transmission to perform uplink transmission. However, if a quantity of transmit antennas configured for the terminal device is greater than a quantity of antennas that can be used for simultaneous transmission, the terminal device needs to send an SRS or another signal in an antenna switching manner.

In LTE, the terminal device may determine an antenna identifier (for example, denoted as $a(n_{SRS})$) of a to-be-switched antenna based on a count (for example, denoted as $n_{SRS}$) corresponding to each transmission opportunity of an SRS, for example, $a(n_{SRS})=n_{SRS}$ mod 2. The transmission opportunity may be determined based on a transmission period of an SRS. Therefore, a to-be-switched antenna for each time of antenna switching is related to a transmission period. In some cases, this method may bring some limitations. For example, if SRS transmission is not based on a transmission period, for example, is aperiodic transmission, an antenna identifier of a to-be-switched antenna cannot be calculated by using this method, and therefore antenna switching may not be supported, thereby limiting performance of the terminal device.

In view of the foregoing, this application provides a signal sending and receiving method, so that antenna switching is decoupled from a transmission period, and performance of a terminal device is improved.

Before embodiments of this application are described, several related concepts in NR are first briefly described.

Antenna: An antenna may be a physical antenna or a virtual antenna, that is, the physical antenna can be a physical antenna group or an antenna panel, or the virtual antenna may be an antenna port, a user port, or a virtual port.

Bandwidth part (BWP): In some communications systems such as a 5G NR system, transmitting or receiving capabilities of different terminal devices in a same cell may be different. The system may configure corresponding bandwidth for each terminal device. This part of bandwidth configured for the terminal device is referred to as a BWP, and the terminal device performs transmission on the BWP of the terminal device. For example, the terminal device transmits an SRS on the BWP of the terminal device, so that a network device performs channel measurement and resource scheduling, and the terminal device transmits data on the BWP of the terminal device based on scheduling by the network device. The system may configure different BWPs for different terminal devices. To support different services, different BWPs may support different transmission bandwidth (that is, the BWPs include different quantities of resource blocks (RBs)), different subcarrier spacings, different cyclic prefixes (CPs), and the like, and a scheduling unit may be a slot, a mini-slot, or the like.

Slot: Because frame structures in different BWPs may be different, slots are also defined differently. In NR, a slot is a minimum scheduling unit. A slot of a slot format includes 14 orthogonal frequency division multiplexing (OFDM) symbols, and a CP of each OFDM symbol is a normal CP; a slot of another slot format includes 12 OFDM symbols, and a CP of each OFDM symbol is an extended CP; a slot of another format includes seven OFDM symbols, and a CP of each OFDM symbol is a normal CP. All OFDM symbols in one slot may be used for uplink transmission, or may be used for downlink transmission. Alternatively, some OFDM symbols in one slot may be used for downlink transmission, some OFDM symbols are used for uplink transmission, and some OFDM symbols are not reserved for transmission. It should be understood that the foregoing illustration is merely an example for description, and should not constitute any limitation on this application. In consideration of system forward compatibility, a slot format of a slot is not limited to the foregoing examples.

Symbol: A time length of a symbol is not limited in embodiments of this application. A length of a symbol may vary for different subcarrier spacings. Symbols may include an uplink symbol and a downlink symbol. The uplink symbol may be referred to as a single carrier frequency division multiple access (SC-FDMA) symbol or an orthogonal frequency division multiplexing (OFDM) symbol. The downlink symbol may be referred to as an OFDM symbol. It should be understood that the foregoing symbol may also correspond to another uplink multiple access manner or another downlink multiple access manner. This is not specifically limited in embodiments of this application.

Subcarrier spacing: A size of a subcarrier spacing is not limited in embodiments of this application. For example, a subcarrier spacing may be 15 kHz, 30 kHz, 60 kHz, 120 kHz, 240 kHz, or 480 kHz. A subcarrier spacing and a symbol length may meet the following formula: Ratio of the subcarrier spacing=1/the symbol length. For example, the symbol length herein may be a length of a symbol that does not include a CP, or a length of each symbol that includes a CP except a first symbol of a half subframe.

The following describes embodiments of this application in detail with reference to the accompanying drawings.

It should be understood that technical solutions in this application may be applied to a wireless communications system, for example, the communications system 100 shown in FIG. 1. The communications system may include at least one network device and at least one terminal device, and the network device and the terminal device may communicate with each other through a radio air interface. For example, the network device in the communications system may correspond to the network device 102 shown in FIG. 1, and the terminal device may correspond to the terminal devices 104 to 114 shown in FIG. 1.

It should be further understood that in embodiments of this application, for ease of understanding only, an SRS is used as an example to describe technical solutions. However, this should not constitute any limitation on this application. The method provided in embodiments of this application is not only applicable to SRS transmission, but also applicable to other transmission of a reference signal used for channel measurement. In addition, the reference signal used for channel measurement is not limited in this application either. The reference signal may be a DMRS or a phase tracking reference signal (PTRS), or may be another reference signal newly defined in a future protocol and used to implement a same or similar function.

Generally, the following uses a process of interaction between a terminal device and a network device as an example to describe embodiments of this application in detail. The terminal device may be any terminal device that is in the wireless communications system and that has a wireless connection relationship with the network device. It may be understood that the network device and a plurality of terminal devices that are in the wireless communications system and that have a wireless connection relationship may transmit a reference signal based on a same technical solution. This is not limited in this application.

Figure 2:
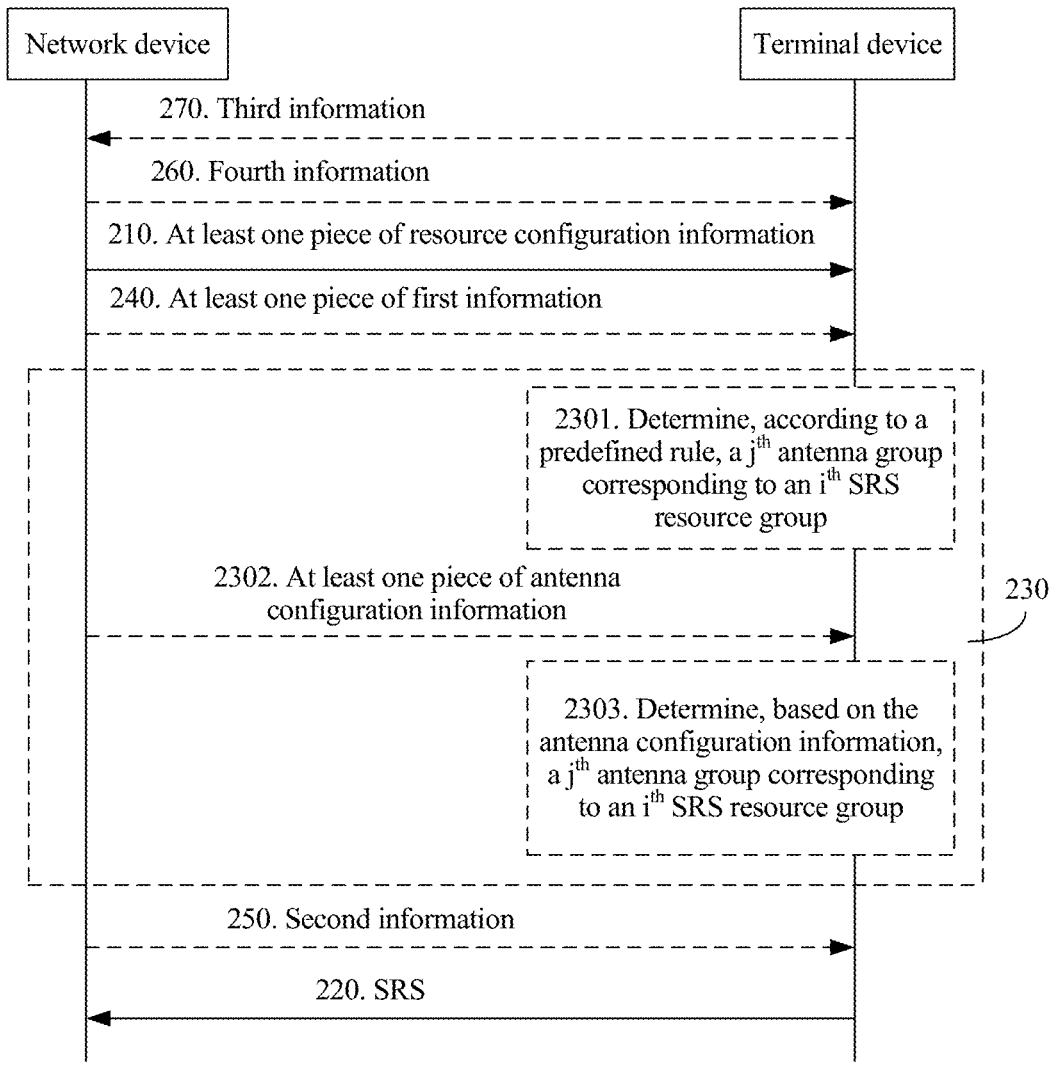
FIG. 2 is a schematic flowchart of a signal sending and receiving method according to an embodiment of this application.

FIG. 2 is a schematic flowchart of a reference signal transmission and receiving method 200 according to an embodiment of this application from a perspective of interaction between devices. As shown in FIG. 2, the method 200 may include step 210 to step 270.

In step 210, a network device sends at least one piece of resource configuration information, where the at least one piece of resource configuration information may be used to determine N SRS resource groups.

Correspondingly, in step 210, a terminal device receives the at least one piece of resource configuration information, where the at least one piece of resource configuration information may be used to determine the N SRS resource groups.

N may be an integer greater than or equal to 2. Each of the N SRS resource groups may include at least one reference signal. An SRS resource may be understood as a resource used to transmit a reference signal. As an example instead of a limitation, the SRS resource may include at least one of the following: a frequency domain resource, a time domain resource, a code domain resource, or an antenna port, and the code domain resource may include at least one of the following: a sequence, a cyclic shift, or an orthogonal cover code (OCC).

Time-frequency resources of at least two of the N SRS resource groups are different. In other words, the at least two SRS resource groups do not overlap in time domain, or the at least two SRS resource groups occupy different time units. To facilitate distinguishing from a time unit below, the time unit is denoted as a first-type time unit. It should be noted that the first-type time unit may be understood as a minimum granularity for dividing an SRS resource in time domain. In this embodiment of this application, the first-type time unit may be a symbol, a slot, a mini-slot, a subframe, or a radio frame, or may be a plurality of symbols, or may be even a part of a symbol such as ½ symbol or ¼ symbol, or may be a predefined time length or the like. A length of a symbol is related to a subcarrier spacing of a component carrier (CC) used by the terminal device to send a signal.

In a possible design, time domain resources of any two of the N SRS resource groups are different. In other words, at least two SRS resource groups do not overlap in time domain, or the any two SRS resource groups occupy different first-type time units.

In this embodiment of this application, there may be a correspondence between the N SRS resource groups and N antenna groups. For example, if the N SRS resource groups are in a one-to-one correspondence with the N antenna groups, an $i^{th}$ SRS resource group (where i is any integer in [1, N]) in the N SRS resource groups corresponds to a $j^{th}$ antenna group (where j is any integer in [1, N]) in the N antenna groups.

In addition, each of the N antenna groups may include at least one antenna. At least two of the N antenna groups are different. Specifically, the at least two of the N antenna groups are totally different or are not exactly the same. For example, an antenna group #0 may include an antenna #0 and an antenna #1, and an antenna group #1 may include the antenna #1 and an antenna #2; or an antenna group #0 may include an antenna #0 and an antenna #1, and an antenna group #1 may include an antenna #2 and an antenna #3.

In a possible design, any two of the N antenna groups include different antennas.

Optionally, when an SRS resource group includes a plurality of SRS resources, at least two SRS resource or all SRS resources in the SRS resource group correspond to different transmit beams, or have irrelevant reference signal port characteristics.

Optionally, when an SRS resource group includes a plurality of SRS resources, at least one SRS resource or all SRS resources in the SRS resource group correspond to a same transmit beam, or have relevant reference signal port characteristics.

It should be noted that the irrelevant reference signal port characteristics may be understood as that reference signal ports do not have a quasi co-located (QCL) relationship or a spatial QCL relationship. The relevant reference signal port characteristics may be understood as that reference signal ports have a QCL relationship or a spatial QCL relationship.

Herein, the spatial QCL relationship may also be understood as a QCL relationship. In this embodiment of this application, the spatial QCL relationship means that signals corresponding to signal antenna ports have a same parameter; or the spatial QCL relationship means that the terminal may determine, based on a parameter of an antenna port, a parameter of another antenna port that has a spatial QCL relationship with the antenna port; or the spatial QCL relationship means that two antenna ports have a same parameter; or the spatial QCL relationship means that a parameter difference between two antenna ports is less than a threshold. The parameter may be at least one of delay spread, Doppler spread, a Doppler shift, an average delay, an average gain, an angle of arrival (AOA), an average AOA, AOA spread, an angle of departure (AOD), an average angle of departure AOD, AOD spread, a receive antenna spatial correlation parameter, a transmit antenna spatial correlation parameter, a transmit beam, a receive beam, and a resource identifier. The beam includes at least one of a precoder, a weight sequence number, and a beam sequence number. The angles may be decomposition values at different dimensions or a combination of decomposition values at different dimensions. The antenna ports are antenna ports having different antenna port numbers, and/or antenna ports that have a same antenna port number and that are used to send or receive information on different time, frequency, and/or code domain resources, and/or antenna ports that have different antenna port numbers and that are used to send or receive information on different time, frequency, and/or code domain resources. The resource identifier includes a resource identifier of a channel state information-reference signal (CSI-RS), or a resource identifier of an SRS, or a resource identifier of a synchronization signal/a synchronization signal block, or a resource identifier of a preamble sequence transmitted on a physical random access channel (PRACH), or a resource identifier of a DMRS, and is used to indicate a beam on a resource. For example, a spatial QCL relationship between a port for a downlink signal and a port for a downlink signal or between a port for an uplink signal and a port for an uplink signal may be that the two signals may have a same AOA or AOD, and is used to indicate that the two signals have a same receive beam or transmit beam. For another example, a QCL relationship between a downlink signal and an uplink signal or between a port for an uplink signal and a port for a downlink signal may be that a correspondence exists between AOAs and AODs of the two signals, or that a correspondence exists between AODs and AOAs of the two signals, that is, by using a beam correspondence, an uplink transmit beam may be determined based on a downlink receive beam, or a downlink receive beam may be determined based on an uplink transmit beam.

Signals transmitted on ports having a spatial QCL relationship may also be understood as having a corresponding beam, where the corresponding beam includes at least one of the following: a same receive beam, a same transmit beam, a transmit beam corresponding to a receive beam (corresponding to a reciprocity scenario), and a receive beam corresponding to a transmit beam (corresponding to a reciprocity scenario).

Signals transmitted on ports having a spatial QCL relationship may also be understood as signals received or sent by using a same spatial filter. The spatial filter may be at least one of the following: a precoder, a weight of an antenna port, phase deflection of an antenna port, or an amplitude gain of an antenna port.

Signals transmitted on ports having a spatial QCL relationship may also be understood as having a corresponding beam pair link (BPL), where the corresponding BPL includes at least one of the following: a same downlink BPL, a same uplink BPL, an uplink BPL corresponding to a downlink BPL, and a downlink BPL corresponding to an uplink BPL.

Optionally, the at least one piece of resource configuration information is carried in higher layer signaling.

For example, the higher layer signaling may include a radio resource control (RRC) message and a media access control (MAC) control element (CE).

It should be understood that the foregoing enumerated higher layer signaling is merely an example for description, and should not constitute any limitation on this application. The higher layer signaling may further include other higher layer signaling. For brevity, no enumeration is provided herein. For brevity, the related descriptions of the higher layer signaling are omitted when the higher layer signaling is involved below.

In step 220, the terminal device sends a reference signal on a resource in an $i^{th}$ SRS resource group in the N SRS resource groups by using a $j^{th}$ antenna group corresponding to the $i^{th}$ SRS resource group.

Herein, a "correspondence" between the $i^{th}$ SRS resource group and the $i^{th}$ antenna group may be understood as follows: The terminal device may send a reference signal on a resource in the $i^{th}$ SRS resource group by using the $j^{th}$ antenna group. It should be noted that if the $i^{th}$ SRS resource group includes a plurality of SRS resources, the terminal device may send a reference signal on the plurality of SRS resources by using the $j^{th}$ antenna group.

For example, the N SRS resource groups may include an SRS resource group #0 and an SRS resource group #1, and the N antenna groups may include the foregoing antenna group #0 and the foregoing antenna group #1. The SRS resource group #0 may correspond to the antenna group #0, the SRS resource group #1 may correspond to the antenna group #1, and the SRS resource group #0 and the SRS resource group #1 do not overlap in time domain. In this case, the terminal device may send a reference signal on at least a part of resources in the SRS resource group #0 by using the antenna group #0, and the terminal device may send a reference signal on at least a part of resources in the SRS resource group #1 by using the antenna group #1. It should be understood that herein, to facilitate distinguishing between different SRS resource groups and distinguishing between different antenna groups only, the different SRS resource groups and the different antenna groups are separately identified by using different numbers. However, this should not constitute any limitation on this application. When the network device sends resource configuration information to the terminal device, the network device may not define a number of each SRS resource group, and the terminal device does not define a number of each SRS resource group either.

Actually, in this application, for ease of understanding and description only, one or more SRS resources are referred to as one SRS resource group, and one or more antennas are referred to as one antenna group. However, this should not constitute any limitation on this application. In this application, one or more SRS resources may correspond to one or more antennas, or one or more reference signal resources may correspond to one antenna group, or one reference signal resource group may correspond to one or more antennas. Although the plurality of SRS resources are not referred to as one SRS resource group or the plurality of antennas are not referred to as one antenna group in these cases, when a correspondence between a resource and an antenna is being determined, the plurality of SRS resources are in essence considered as one SRS resource group or the plurality of antennas are in essence considered as one antenna group. This makes no difference in essence, and therefore may fall within the protection scope of this application. For example, the network device configures M×N SRS resources and N antennas. Every M non-duplicate SRS resources may correspond to one antenna. In essence, every M SRS resources are considered as one SRS resource group. A correspondence between every M SRS resources and the N antennas is established. For another example, the network device configures 2M reference signal resources and 2L antennas. Every M non-duplicate SRS resources may correspond to L antennas. In essence, every M reference signal resources are considered as one reference signal resource group, and every L antennas are considered as one antenna group. A correspondence between every M reference signal resources and every L antennas may be established, for example, M=1 or M>1, and L=1 or L=2 or L>2.

It should be noted that in this embodiment of this application, whether quantities of antennas in antenna groups corresponding to all reference signal resource groups are the same is not limited, that is, the quantities of antennas in the antenna groups corresponding to all the reference signal resource groups may be the same, or may be partially the same, or may be totally different.

It should be further noted that in this application, for ease of understanding and description only, a specific process of sending and receiving a reference signal is described by using one time of reference signal transmission as an example. However, this should not constitute any limitation on this application. Optionally, a quantity of times the terminal device sends a reference signal may be determined based on any one of the following: a ratio of a quantity of downlink antennas to a quantity of uplink antennas, and a ratio of the quantity of uplink antennas to a quantity of uplink antennas that can be used for simultaneous transmission. For example, for a terminal device whose antenna configuration is aTbR, one time of antenna switching may be completed through a/b times of reference signal transmission, where a and b are positive integers. When a/b is not an integer, rounding up, rounding down, or rounding off may be performed. This is not limited in this application.

Optionally, the at least one piece of resource configuration information includes only one piece of resource configuration information, and the resource configuration information may be used to determine the N SRS resource groups.

Optionally, the at least one piece of resource configuration information includes a plurality of pieces of resource configuration information, and each piece of resource configuration information is used to determine one of the N SRS resource groups.

That is, the network device may send resource configuration related information of the N SRS resource groups to the terminal device by using one piece of resource configuration information, or the network device may send resource configuration information of each reference signal resource in the N SRS resource groups to the terminal device.

Optionally, before step 220, the method 200 further includes:

Step 230: The terminal device determines the $j^{th}$ antenna group corresponding to the $i^{th}$ SRS resource group.

It should be noted that, as described in detail above, a correspondence between an SRS resource group and an antenna group and a correspondence between an SRS resource and an antenna are in essence the same. Therefore, determining a correspondence between an SRS resource group and an antenna group may be in essence understood as determining a correspondence between an SRS resource and an antenna, or a correspondence between an SRS resource group and an antenna, or a correspondence between an SRS resource and an antenna group.

In this embodiment of this application, the terminal device may determine, in any one of the following manners, the $j^{th}$ antenna group corresponding to the $i^{th}$ SRS resource group:

Manner 1: The terminal device may determine, according to a predefined rule, the $j^{th}$ antenna group corresponding to the $i^{th}$ SRS resource group.

Manner 2: The terminal device may receive antenna configuration information sent by the network device, to determine, based on the antenna configuration information, the $j^{th}$ antenna group corresponding to the $i^{th}$ SRS resource group.

Manner 1 and manner 2 are separately described in detail below.

Manner 1

Optionally, step 230 specifically includes:

Step 2301: The terminal device determines, according to a predefined rule, the $j^{th}$ antenna group corresponding to the $i^{th}$ SRS resource group.

Specifically, the network device and the terminal device may determine, according to the predefined rule, the $j^{th}$ antenna group corresponding to the $i^{th}$ SRS resource group. Optionally, the network device and the terminal device may determine, based on an identifier of an antenna and an identifier of a reference signal resource, the $j^{th}$ antenna group corresponding to the $i^{th}$ SRS resource group.

For example, the N SRS resource groups include an SRS resource #0 and an SRS resource #1, and identifiers of the SRS resources are {0, 1}; the N antenna groups include an antenna #0 and an antenna #1, and identifiers of the antennas are {0, 1}. Assuming that the $i^{th}$ SRS resource group includes an SRS resource whose resource identifier is "0", a correspondence may be established between an SRS resource corresponding to a smaller resource identifier value and an antenna corresponding to a smaller antenna identifier value, that is, it may be determined that an identifier of an antenna included in the $j^{th}$ antenna group corresponding to the $i^{th}$ SRS resource group is 0.

Still further, step 2301 may include:

the terminal device determines a one-to-one correspondence between the N SRS resource groups and the N antenna groups according to the predefined rule; and the terminal device determines, based on the one-to-one correspondence between the N SRS resource groups and the N antenna groups, the $j^{th}$ antenna group corresponding to the $i^{th}$ reference signal resource group.

Specifically, the network device and the terminal device may determine a one-to-one correspondence between the N reference signal resource groups and the N antenna groups according to the predefined rule. Optionally, the network device and the terminal device may determine the one-to-one correspondence between the N reference signal resource groups and the N antenna groups based on an identifier of an antenna and an identifier of a reference signal resource.

In a possible design, the one-to-one correspondence between the N SRS resource groups and the N antenna groups may be established in ascending order of antenna identifiers and in ascending order of SRS resource identifiers.

The following Table 1, Table 2, Table 3, and Table 4 separately provide possible correspondences between SRS resource identifiers (SRS Resource Indicator, SRI) and antenna group identifiers for different antenna configurations (1T2R, 2T4R, and 1T4R). In the correspondences shown in the following Table 1 to Table 4, {SRI0, SRI1, SRI2, SRI3} may be four SRS resource identifiers and meet SRI0<SRI1<SRI2<SRI3.

As shown in Table 1, the one-to-one correspondence between the N resource groups and the N antenna groups may be established based on an antenna identifier or an antenna group identifier, and an SRS resource identifier. For example, a one-to-one correspondence between the SRI0 and the antenna group #1 and a one-to-one correspondence between the SRI0 and the 1T2R antenna #0 or the 2T4R antennas #0 and #1 are separately established. When an SRS resource is used, a corresponding antenna group or antenna may be determined.

TABLE 1

| SRS resource identifier | Antenna group identifier | 1T2R antenna identifier | 2T4R antenna identifier |
|---|---|---|---|
| SRI0 | 0 | {0} | {0, 1} |
| SRI1 | 1 | {1} | {2, 3} |

It should be understood that Table 1 is merely a possible design, and a correspondence between an SRS resource and an antenna group or an antenna in Table 1 may be represented by using Table 2 and Table 3. For example, a correspondence between an SRS resource and an antenna may be determined based on an SRS resource identifier and an antenna group identifier and based on a one-to-one correspondence between an antenna group identifier and a 1T2R antenna identifier and a one-to-one correspondence between an antenna group identifier and a 2T4R antenna identifier.

TABLE 2

| SRS resource identifier | Antenna group identifier |
|---|---|
| SRI0 | 0 |
| SRI1 | 1 |

TABLE 3

| Antenna group identifier | 1T2R antenna identifier | 2T4R antenna identifier |
|---|---|---|
| 0 | {0} | {0, 1} |
| 1 | {1} | {2, 3} |

Table 4 shows a one-to-one correspondence between an SRS resource identifier and a 1T4R antenna identifier.

TABLE 4

| SRS resource identifier | 1T4R antenna identifier |
|---|---|
| SRI0 | {0} |
| SRI1 | {1} |
| SRI2 | {2} |
| SRI3 | {3} |

It should be understood that the foregoing enumerated correspondence between an SRS resource identifier and an antenna identifier or an antenna group identifier is merely an example for description, and should not constitute any limitation on this application. For example, {SRI0, SRI1, SRI2, and SRI3} may also meet SRI0>SRI1>SRI2>SRI3. It should be further understood that indicating a correspondence between an SRS resource and an antenna or an antenna group by using a table is merely a possible implementation, and should not constitute any limitation on this application. An implementation of indicating a correspondence between an SRS resource and an antenna or an antenna group is not specifically limited in this application. For another example, the N SRS resource groups include an SRS resource #0 and an SRS resource #1, and identifiers of the SRS resources are {0, 1}; the N antenna groups include an antenna #0, an antenna #1, an antenna #2, and an antenna #3, identifiers of the antennas are {0, 1, 2, 3}. If the antenna identifiers are mapped to the SRS resource identifiers in ascending order, a correspondence between an SRS resource whose SRS resource identifier is 0 and antenna identifiers {0, 1} and a correspondence between an SRS resource whose SRS resource identifier is 1 and antenna identifiers {2, 3} are obtained, that is, correspondences between two SRS resource groups and two antenna resource groups are obtained, where each SRS resource group includes one SRS resource, and each antenna group includes two antennas.

For another example, the N SRS resource groups include an SRS resource #0, an SRS resource #1, an SRS resource #2, an SRS resource #3, an SRS resource #4, an SRS resource #5, an SRS resource #6, and an SRS resource #7, and identifiers of the SRS resources are {0, 1, 2, 3, 4, 5, 6, 7}; the N antenna groups include an antenna #0, an antenna #1, an antenna #2, and an antenna #3, and identifiers of the antennas are {0, 1, 2, 3}. If the antenna identifiers are mapped to the SRS resource identifiers in ascending order, a correspondence between SRS resource identifiers {0, 1, 2, 3} and antenna identifiers {0, 1} and a correspondence between SRS resource identifiers {4, 5, 6, 7} and antenna identifiers {2, 3} are obtained, that is, correspondences between two SRS resource groups and two antenna groups are obtained. Each SRS resource group includes four SRS resources, and each antenna group includes two antennas.

It should be understood that the foregoing rule is merely a possible implementation, and should not constitute any limitation on this application. For example, a correspondence between an antenna and an SRS resource may alternatively be established in descending order of antenna identifiers and in ascending order of SRS resource numbers. Alternatively, a correspondence between an antenna and an SRS resource may alternatively be established in ascending order of antenna identifiers and in sequential order of time domain resources in SRS resources. Alternatively, a correspondence may alternatively be established in descending order or ascending order of antenna identifiers based on values obtained after a modulo operation is performed on antenna groups by using reference signal resource numbers.

Optionally, an antenna identifier in the foregoing embodiment may alternatively be an antenna group identifier, and each antenna group includes one or more antennas. Identifiers of included antennas may be consecutive or non-consecutive. For example, numbers of antennas in two antenna groups are {1, 2} and {2, 3} or are {0, 2} and {1, 4}. Antennas in one antenna group may be used for simultaneous transmission.

In some cases, the network device may configure one identifier for each SRS resource group, and the terminal device may configure one identifier for each antenna group. The terminal device may directly determine, based on an identifier of an antenna group and an identifier of an SRS resource group, the $j^{th}$ antenna group corresponding to the $i^{th}$ SRS resource group.

The terminal device may determine, according to the predefined rule, the $j^{th}$ antenna group corresponding to the $i^{th}$ SRS resource group. For example, the $j^{th}$ antenna group corresponding to the $i^{th}$ SRS resource group is determined based on related content described above. A specific implementation has been described in detail in the foregoing plurality of embodiments. For brevity, no enumeration is provided herein.

Manner 2

Optionally, step 230 specifically includes:

Step 2302: The terminal device receives at least one piece of antenna configuration information, where the at least one piece of antenna configuration information is used to indicate a correspondence between the N antenna groups and the N SRS resource groups.

Step 2303: The terminal device determines, based on the one-to-one correspondence between the N SRS resource groups and the N antenna groups, the $j^{th}$ antenna group corresponding to the $i^{th}$ reference signal resource group.

Specifically, the network device may configure a correspondence between an SRS resource group and an antenna group, and send the configured correspondence between the N antenna groups and the N SRS resource groups to the terminal device by using antenna configuration information, so that the terminal device determines, based on the correspondence between the N antenna groups and the N SRS resource groups, the $j^{th}$ antenna group corresponding to the $i^{th}$ SRS resource group.

In a possible design, the network device may represent the one-to-one correspondence between the N SRS resource groups and the N antenna groups by using an identifier of an SRS resource group and an identifier of an antenna group or by using an identifier of an SRS resource and an identifier of an antenna. For example, the antenna configuration information may be a table used to indicate the one-to-one correspondence between the N SRS resource groups and the N antenna groups, and the network device may send the table to the terminal device by using the antenna configuration information, so that the terminal device determines, based on the one-to-one correspondence, the $j^{th}$ antenna group corresponding to the $i^{th}$ SRS resource group.

In another possible design, the network device may represent a correspondence between each SRS resource in the N SRS resource groups and an antenna group by using an identifier of an SRS resource and an identifier of an antenna. For example, the antenna configuration information may carry an identifier of an SRS resource and an identifier of a corresponding antenna, and each piece of antenna configuration information indicates an antenna corresponding to one SRS resource.

It should be understood that specific forms of the antenna configuration information enumerated above are merely examples for description, and should not constitute any limitation on this application. In this application, the network device may indicate the one-to-one correspondence between the N SRS resource groups and the N antenna groups to the terminal device in another manner.

Optionally, the method 200 further includes:

Step 240: The network device sends at least one piece of first information, where the first information indicates whether a reference signal to be transmitted on each SRS resource in the N SRS resource groups or a reference signal to be sent by the terminal device is to be sent in an antenna switching manner or whether the reference signal is used to measure a channel for antenna selection.

It should be noted that a case in which the network device indicates that an SRS resource is to be sent in an antenna switching manner or an SRS resource is used to measure a channel for antenna selection may be referred to as a case in which the network device enables an SRS resource. The first information may be considered as an antenna switching enabling indication, that is, the first information indicates whether an SRS resource is to be sent in an antenna switching manner or an SRS resource is used to measure a channel for antenna selection, or indicates whether antenna switching is enabled for an SRS resource, or indicates whether an antenna selection function or an antenna switching function is enabled for an SRS resource.

In this embodiment of this application, whether antenna switching is enabled may be configured for an SRS resource group, or may be configured for all SRS resources or SRS resource groups in a BWP, or may be configured for all SRS resources or SRS resource groups in a CC, or may be configured for one or more specific SRS resources or SRS resource groups in a BWP or a CC, or may be configured for an SRS resource or SRS resource group configured for the terminal device. This is not limited in this application.

Optionally, step 240 includes:
the network device sends a plurality of pieces of first information, where each piece of first information is used to indicate whether a reference signal on one SRS resource is to be sent in an antenna switching manner or whether the reference signal is used to measure a channel for antenna selection, and each piece of first information corresponds to one SRS resource in the N SRS resource groups.

Correspondingly, the terminal device receives the plurality of pieces of first information.

That is, the network device indicates, for each SRS resource in the N SRS resource groups, whether a reference signal to be transmitted on each SRS resource is to be sent in an antenna switching manner or is used to measure a channel for antenna selection. In this case, a quantity of pieces of first information sent by the network device to the terminal device may be a quantity of SRS resources in the N SRS resource groups.

Optionally, step 240 includes:
the network device sends at least one piece of first information, where each piece of first information is used to indicate whether reference signals to be transmitted on all SRS resources in an SRS resource set to which one SRS resource belongs are to be sent in an antenna switching manner or are used to measure a channel for antenna selection.

Correspondingly, the terminal device receives the at least one piece of first information.

Specifically, the network device may define the N SRS resource groups as one SRS resource set. In a possible design, if a reference signal to be transmitted on any SRS resource in one SRS resource set is to be sent in an antenna switching manner or is used to measure a channel for antenna selection, reference signals to be transmitted on all SRS resources in the SRS resource set are to be sent in an antenna switching manner or are used to measure a channel for antenna selection. Therefore, the network device may indicate whether antenna switching is enabled for any SRS resource in one SRS resource set, so as to indicate whether antenna switching is enabled for all SRS resources in the SRS resource set.

Optionally, one SRS resource set includes at least one of the N SRS resource groups.

One SRS resource set may include the N SRS resource groups, or may include one or more of the N SRS resource groups. Alternatively, the N SRS resource groups may belong to one or more SRS resource sets. In other words, one SRS resource set may include a plurality of SRS resources.

It should be noted that the network device may configure a plurality of SRS resource sets for the terminal device. For example, SRS resources in a same SRS resource set may be used for a same function or a plurality of functions, for example, transmit beam scanning, receive beam scanning, antenna switching, CSI measurement, and a set of two or more of the foregoing enumerated functions. This is not limited in this application. A plurality of SRS resource sets configured by a base station may correspond to the foregoing N antenna groups, or may correspond to different antenna groups. This is not limited in this application. Optionally, the plurality of SRS resource sets correspond to different transmit beams.

In this case, a quantity of pieces of first information sent by the network device may be a quantity of SRS resource sets configured by the network device for the terminal device.

Optionally, step 240 includes:
the network device sends at least one piece of first information, where each piece of first information is used to indicate whether reference signals to be transmitted on all SRS resources in one reference signal resource set are to be sent in an antenna switching manner or whether the reference signals are used to measure a channel for antenna selection.

For an SRS resource set, refer to the foregoing related descriptions. In a possible design, the network device may indicate whether antenna switching is enabled for one SRS resource set to indicate whether all SRS resources in the SRS resource set are to be sent in an antenna switching manner or are used to measure a channel for antenna selection.

In this case, a quantity of pieces of first information sent by the network device may be a quantity of SRS resource sets configured by the network device for the terminal device.

Optionally, step 240 includes:

the network device sends one piece of first information, where the first information is used to indicate whether all reference signals to be sent by the terminal device are to be sent in an antenna switching manner or whether all the reference signals are used to measure a channel for antenna selection.

Correspondingly, the terminal device receives one piece of first information.

That is, the network device may send one piece of first information to the terminal device, to indicate whether antenna switching is enabled for all the reference signals sent by the terminal device, in other words, all the reference signals to be sent by the terminal device may be to be sent in an antenna switching manner, or all the reference signals may be not to be sent in an antenna switching manner.

After receiving the foregoing at least one piece of first information, the terminal device may determine, based on the received at least one piece of first information, whether a reference signal to be transmitted on each SRS resource in the N SRS resource groups or a reference signal to be sent by the terminal device is to be sent in an antenna switching manner or whether the reference signal is used to measure a channel for antenna selection.

It should be understood that in a possible implementation, the network device indicates whether antenna switching is enabled for an SRS resource, and whether antenna switching is enabled for an SRS resource may be predefined. For example, a protocol specifies that antenna switching is enabled in a case in which a quantity of antennas used for simultaneous transmission is less than a quantity of downlink receive antennas, or a quantity of antennas that can be used for simultaneous transmission is less than a total quantity of uplink transmit antennas.

Optionally, the method 200 further includes:

Step 250: The network device sends second information, where the second information is used to indicate a start moment of sending a reference signal.

Correspondingly, the terminal device receives the second information, where the second information is used to determine the start moment of sending a reference signal.

Specifically, in this embodiment of this application, reference signals may include a periodically transmitted reference signal, an aperiodically transmitted reference signal, and a semi-persistently transmitted reference signal. For the periodically transmitted reference signal and the semi-persistently transmitted reference signal, the network device may indicate a transmission period and an offset value of a start moment by using the resource configuration information, and for the aperiodically transmitted reference signal, only an offset value of a start moment relative to a trigger indication may be indicated in the resource configuration information. Therefore, the network device may send the trigger indication to the terminal device, so that the terminal device determines, based on a sending moment of the trigger indication and the offset value indicated in the resource configuration information, the start moment of sending a reference signal. For ease of distinguishing, the trigger indication is denoted as second information. Optionally, the second information may be downlink control information (DCI). The second information may alternatively be other information or signaling. This is not limited in this application.

After determining, based on the received second information, the start moment of sending a reference signal, the terminal device may send a reference signal on different SRS resource groups by using different antennas. For example, if offset values k1 and k2 are separately configured for two SRS resources (that is, the offset values k1 and k2 are carried in resource configuration information), and DCI corresponds to a slot/symbol n, a first SRS resource corresponds to a slot/symbol n+k1, and a second SRS resource corresponds to a slot/symbol n+k2. Alternatively, if indication information of a guard period (that is, a value of Y in fourth information mentioned below) is configured, k2 does not need to be configured, an SRS is sent in the slot/symbol n+k1 on the first SRS resource and then starts to be sent in a slot/symbol following a slot/symbol n+k1+Y.

In this embodiment of this application, a trigger indication may trigger a plurality of times of reference signal transmission, and an antenna used for each time of SRS transmission may vary. One time of antenna switching may be completed through a plurality of times of transmission, that is, antennas that need to be used for channel measurement are polled. In other words, a quantity of times of reference signal transmission may be a quantity of times of reference signal transmission needed for completing one time of antenna switching.

When the terminal device performs antenna switching, for example, switching from the antenna group #1 to the antenna group #2, a time interval between two SRS resource groups separately corresponding to the antenna group #1 and the antenna group #2 needs to be greater than or equal to (or greater than) one guard period. A time length of the guard period may be represented or quantized by a quantity of time units. To facilitate distinguishing from the first-type time unit above, the time unit herein may be denoted as a second-type time unit.

The guard period may be understood as a time period needed by the terminal device to perform antenna switching, and the terminal device does not perform uplink transmission in the guard period.

In this embodiment of this application, the second-type time unit may be a symbol, a slot, a mini-slot, a subframe, or a radio frame, or may be a plurality of symbols, or may be even ½ symbol or ¼ symbol, or may be a predefined time length or the like. It should be understood that the first-type time unit and the second-type time unit may be a same time unit or may be different time units. This is not limited in this application.

Optionally, a time length of one guard period includes Y second-type time units, where Y≥1, and Y is an integer.

Optionally, the method 200 further includes:

Step 260: The network device sends fourth information, where the fourth information indicates a value of Y.

Correspondingly, in step 260, the terminal device receives the fourth information, where the fourth information indicates the value of Y.

That is, the network device may configure the time length of the guard period for the terminal device based on a frequency band on which a BWP of the terminal device is located and a corresponding subcarrier spacing, and notify the terminal device of the time length of the guard period by indicating the value of Y to the terminal device.

Optionally, a value range of Y is determined based on at least one of the following: a carrier frequency of a frequency domain resource used by the terminal device to send a reference signal and/or a subcarrier spacing used by the terminal device to send a reference signal.

It may be understood that if subcarrier frequencies are different, corresponding subcarrier spacings may be different. For example, when a carrier frequency is below 6 GHz, a subcarrier spacing may be 15 kHz, 30 kHz, or 60 kHz; when a carrier frequency is above 6 GHz, a subcarrier spacing may be 120 kHz, 240 kHz, or 480 kHz.

For example, it is assumed that the second-type time unit is a symbol. When the subcarrier spacing is 15 kHz, 30 kHz, or 60 kHz, the value of Y may be 1; when the subcarrier spacing is 120 kHz, the value of Y may be 2; when the subcarrier spacing is 240 kHz, the value of Y may be 4; when the subcarrier spacing is 480 kHz, the value of Y may be 8.

The value range of Y may be predefined, for example, the value range of Y is defined by a protocol. For example, the value range of Y corresponding to a plurality of possible subcarrier spacings may be defined by the protocol. The value range may be understood as a candidate set of values of Y. It should be understood that a candidate set corresponding to each subcarrier spacing may include at least one value.

For example, it is assumed that the second time unit is a symbol. When the subcarrier spacing is 15 kHz, 30 kHz, or 60 kHz, the value range of Y may be {0, 1} or a subset thereof when the subcarrier spacing is 120 kHz, the value range of Y may be {0, 1, 2} or a subset thereof when the subcarrier spacing is 240 kHz, the value range of Y may be {0, 1, 2, 3, 4} or a subset thereof; when the subcarrier spacing is 480 kHz, the value range of Y may be {0, 1, 2, 3, 4, 5, 6, 7, 8} or a subset thereof.

Therefore, the network device may further configure the time length of the guard period for the terminal device based on the value range of Y.

Further, optionally, the method 200 further includes:

Step 270: The terminal device sends third information, where the third information carries a reference value of a time interval needed by the terminal device, or the third information carries a minimum value of a time interval needed by the terminal device.

Correspondingly, in step 270, the network device receives the third information, where the third information carries the reference value of the time interval needed by the terminal device, or the third information carries the minimum value of the time interval needed by the terminal device.

The time interval needed by the terminal device may be understood as a guard period.

In some communications systems such as a 5G NR system, BWPs of different terminal devices may be located on different frequency bands, and correspond to different subcarrier spacing. In addition, processing speeds of antenna switching performed by different terminal devices may also be different. Therefore, different terminal devices may impose different time interval requirements. Therefore, the terminal device may report, to the network device, the reference value or the minimum value of the time interval needed by the terminal device. It may be understood that the time length of the guard period is greater than or equal to the minimum value that is of the time interval needed by the terminal device and that is reported by the terminal device.

Therefore, the network device may further determine the value of Y based on the reference value or the minimum value that is of the time interval and that is reported by the terminal device.

It should be understood that the foregoing method for configuring the value of Y by the network device, the foregoing method for defining the value of Y by the protocol, and the foregoing method for reporting the value of Y by the terminal device may be separately used or may be combined. This is not limited in this application.

A time interval of SRS resource groups in at least two SRS resource groups is greater than or equal to (or greater than) one guard period. In addition, when performing rate matching or sending a physical uplink control channel (PUCCH), the terminal device may control, based on a time length of the guard period, a time interval of another signal (for example, a DMRS, data, or signaling) or channel (for example, a physical uplink shared channel (PUSCH) or a PUCCH) and a reference signal to be greater than or equal to one guard period, that is, mapping the another signal or channel to a resource outside the guard period, so as to avoid a problem that signal quality of some symbols may deteriorate due to a very short time domain distance between different signals. Therefore, signal receiving quality is improved, and performance of the terminal device is improved.

It should be noted that a time interval of SRS resource groups in two SRS resource groups may be greater than or equal to one guard period, or may be greater than one guard period. If a time interval of SRS resource groups in two SRS resource groups needs to be greater than or equal to one guard period, when the time interval is less than one guard period, an SRS (namely, an example of a first signal in the method provided below) may be transmitted by using the method provided below. If a time interval of SRS resource groups in two SRS resource groups needs to be greater than or equal to one guard period, when the time interval is less than or equal to one guard period, an SRS may be transmitted by using the method provided below.

Based on the foregoing technical solution, the terminal device may flexibly perform antenna switching based on a correspondence between a reference signal resource and an antenna. In comparison with the prior art, antenna switching can be decoupled from a transmission period, and this embodiment is applicable to reference signal transmission in various possible manners, thereby improving performance of the terminal device.

When sending an uplink reference signal (for example, an SRS), the terminal device may simultaneously send another uplink signal or channel, for example, a physical uplink control channel (PUCCH), a physical uplink shared channel (PUSCH), a physical random access channel (PRACH), an uplink DMRS, or a phase tracking reference signal (PTRS). When transmission resources of two signals or channels overlap in time domain or a time interval between the transmission resources is less than one guard period, and transmit antennas of the two signals or channels cannot be used for simultaneous transmission, a resource conflict may occur. In a time period of antenna switching, that is, in a guard period, signal receiving quality deteriorates.

In view of the foregoing, this application further provides a signal sending and receiving method, to reduce a resource conflict and ensure signal receiving quality.

It should be noted that, for ease of description in the following, a case in which a time interval between two resource groups is less than one guard period is understood as a case in which signal quality may deteriorate, and a case in which a time interval between two resource groups is greater than or equal to one guard period is understood as a case in which signal quality can be ensured. However, this should not constitute any limitation on this application. For example, a case in which a time interval between two resource groups is less than or equal to one guard period is understood as a case in which signal quality may deteriorate, and a case in which a time interval between two resource groups is greater than one guard period is understood as a case in which signal quality can be ensured. This is not limited in this application.

With reference to FIG. 3 to FIG. 9, the following describes in detail a signal sending and receiving method according to another embodiment of this application.

In this embodiment of this application, an uplink signal may include but is not limited to an SRS, a DMRS, or a PTRS. An uplink channel may include but is not limited to a PUSCH, a PUCCH, or a PRACH.

Figure 3:
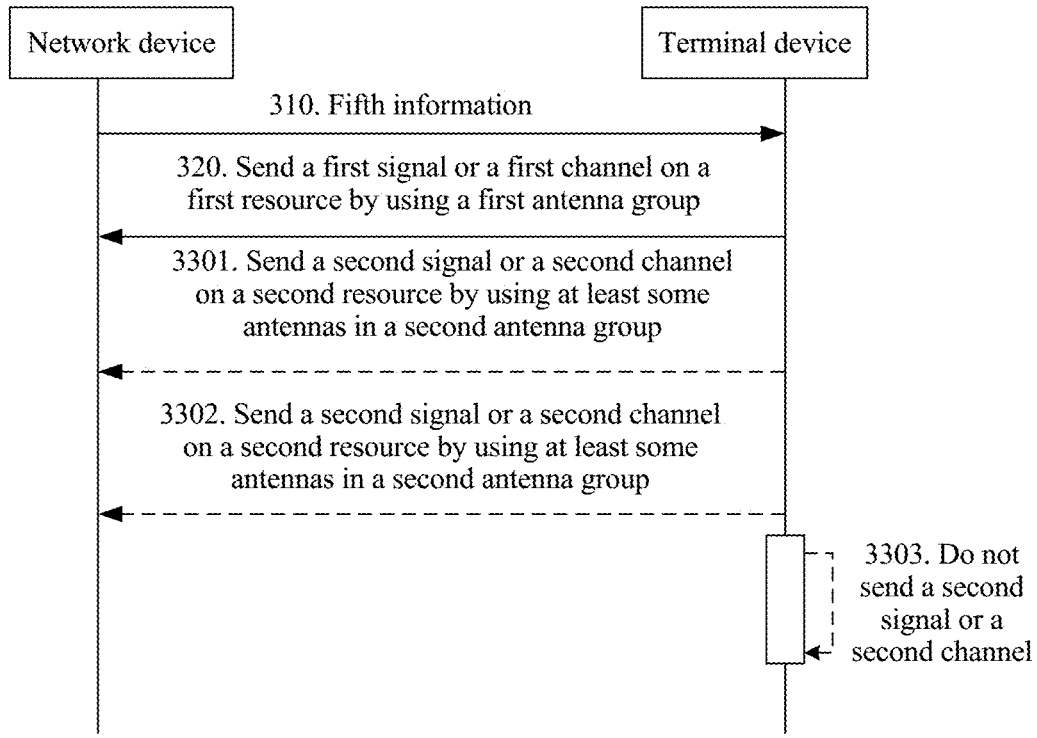
FIG. 3 is a schematic flowchart of a signal sending and receiving method according to another embodiment of this application.

FIG. 3 is a schematic flowchart of a signal sending and receiving method 300 according to another embodiment of this application from a perspective of interaction between devices. As shown in FIG. 3, the method 300 may include step 310 to step 3303.

In step 310, a network device sends fifth information, where the fifth information indicates a first resource used to transmit a first signal or a first channel and a second resource used to transmit a second signal or a second channel.

Correspondingly, in step 310, a terminal device receives the fifth information, where the fifth information indicates the first resource used to transmit the first signal or the first channel and the second resource used to transmit the second signal or the second channel.

The terminal device may determine, based on the received fifth information, a signal and/or a channel transmitted in one time scheduling unit, and a resource used to transmit the signal and/or the channel. Therefore, the terminal device may further determine an antenna group (for example, denoted as a first antenna group) used to transmit the first signal or the first channel and an antenna group (for example, denoted as a second antenna group) used to transmit the second signal or the second channel. For example, the terminal device may determine, by using the method 200 described above, the first antenna group corresponding to the first resource and the second antenna group corresponding to the second resource.

If a time interval between the first resource and the second resource is less than Y second-type time units, and at least some antennas in the first antenna group and at least some antennas in the second antenna group cannot be used for simultaneous transmission, the terminal device preferentially sends a signal with a higher priority. Assuming that a priority of the first signal or the first channel is higher than a priority of the second signal or the second channel, in step 320, the terminal device sends the first signal or the first channel on the first resource by using the first antenna group.

However, it should be understood that this does not mean that the terminal device does not send the second signal or the second channel. The terminal device may process the second signal or the second channel in any one of the following manners:

Manner A: The terminal device sends the second signal or the second channel on the second resource by using at least some antennas in the second antenna group.

Manner B: The terminal device sends the second signal or the second channel on the second resource by using at least some antennas in the first antenna group.

Manner C: The terminal device does not send the second signal or the second channel on the second resource.

The following separately describes Manner A, Manner B, and Manner C in detail with reference to the accompanying drawings.

FIG. 4 to FIG. 9 are schematic diagrams of sending the first signal or the first channel and the second signal or the second channel by the terminal device. In the following examples shown with reference to FIG. 4 to FIG. 9, it is assumed that the first signal or the first channel is a reference signal (for example, an SRS) used for channel measurement and is configured to be transmitted in a symbol 10 to a symbol 13, the second signal or the second channel is a PUSCH and is configured to be transmitted in a symbol 0 to the symbol 10, a priority of the SRS is higher than that of the PUSCH, a guard period includes one symbol, and the symbol 9 is the guard period.

Manner A:

Optionally, the method 300 further includes:

Step 3301: If at least some antennas in the second antenna group and any one of antennas in the first antenna group can be used for simultaneous transmission, the terminal device sends the second signal or the second channel on the second resource by using at least some antennas in the second antenna group.

Figure 4:
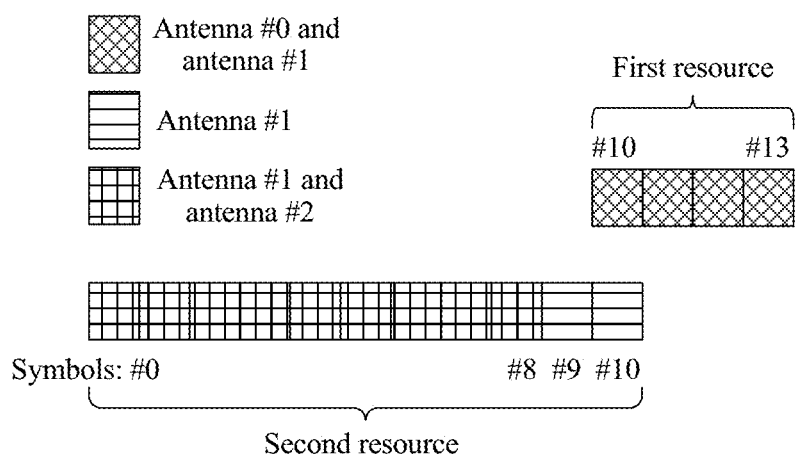
FIG. 4 is a schematic diagram in which a terminal device sends a first signal or a first channel and a second signal or a second channel.

For example, it is assumed that the first antenna group used to transmit the SRS includes an antenna #0 and an antenna #1, the second antenna group used to transmit the PUSCH includes the antenna #1 and an antenna #2, and the antenna #0 and the antenna #2 cannot be used for simultaneous transmission. As shown in FIG. 4, in the symbol 9 and the symbol 10, the terminal device cannot send the PUSCH on the second resource by using the antenna #1 and the antenna #2. In this case, the terminal device may send the PUSCH on the second resource by using the antenna #1 and the antenna #2 in the symbol 0 to the symbol 8, send the PUSCH on the second resource by using only the antenna #1 in the symbol 9 and the symbol 10, and send the SRS on the first resource by using the antenna #0 and the antenna #1 in the symbol 10 to the symbol 13.

Figure 5:
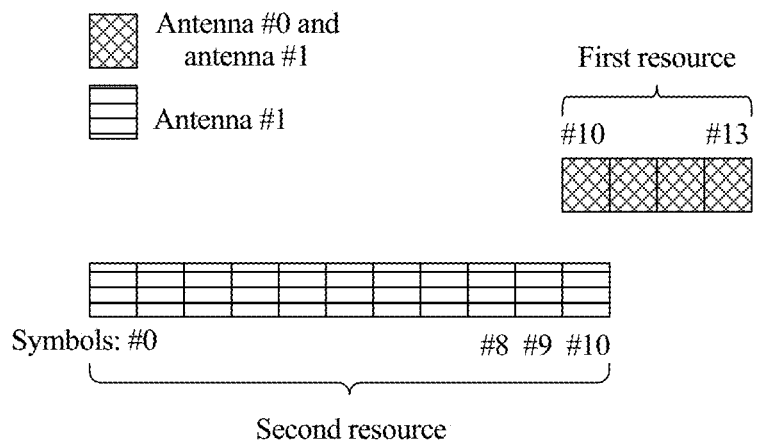
FIG. 5 is another schematic diagram in which a terminal device sends a first signal or a first channel and a second signal or a second channel.

Alternatively, as shown in FIG. 5, in the symbol 9 and the symbol 10, the terminal device cannot send the PUSCH on the second resource by using the antenna #1 and the antenna #2. In this case, the terminal device sends the PUSCH on the second resource by using the antenna #1 in the symbol 0 to the symbol 10, and sends the SRS on the first resource by using the antenna #0 and the antenna #1 in the symbol 10 to the symbol 13.

Manner B:

Optionally, the method 300 further includes:

Step 3302: The terminal device sends the second signal or the second channel on the second resource by using at least some antennas in the first antenna group.

Figure 6:
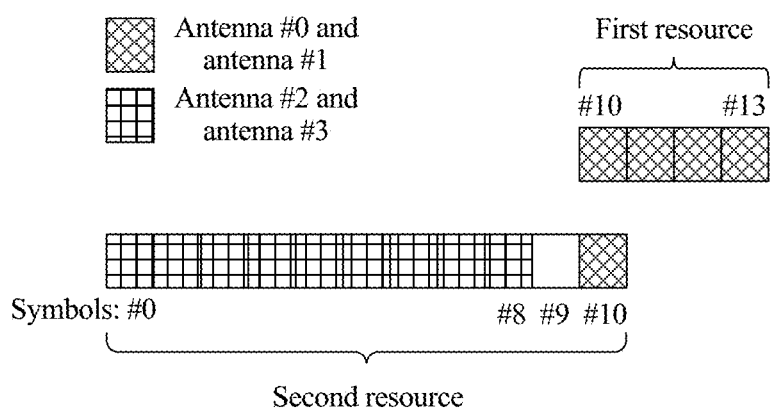
FIG. 6 is still another schematic diagram in which a terminal device sends a first signal or a first channel and a second signal or a second channel.

For example, it is assumed that the first antenna group used to transmit the SRS includes an antenna #0 and an antenna #1, the second antenna group used to transmit the PUSCH includes an antenna #2 and an antenna #3, the antenna #0 and the antenna #2 cannot be used for simultaneous transmission, and the antenna #1 and the antenna #3 cannot be used for simultaneous transmission. As shown in FIG. 6, in the symbol 9 and the symbol 10, the terminal device cannot send the PUSCH on the second resource by using the antenna #2 and the antenna #3. In this case, the terminal device may send the PUSCH on the second resource by using the antenna #2 and the antenna #3 in the symbol 0 to the symbol 8, perform antenna switching but do not send the PUSCH in the symbol 9, send the PUSCH on the second resource by using the antenna #0 and the antenna #1 in the symbol 10, and send the SRS on the first resource by using the antenna #0 and the antenna #1 in the symbol 10 to the symbol 13.

Figure 7:
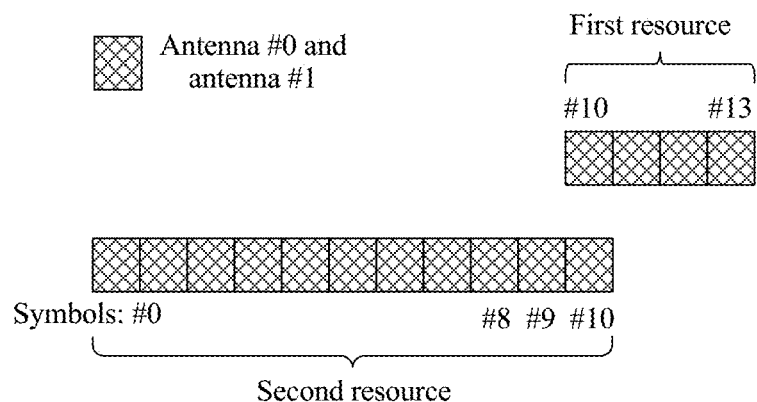
FIG. 7 is yet another schematic diagram in which a terminal device sends a first signal or a first channel and a second signal or a second channel.

Alternatively, as shown in FIG. 7, in the symbol 9 and the symbol 10, the terminal device cannot send the PUSCH on the second resource by using the antenna #2 and the antenna #3. In this case, the terminal device may send the PUSCH on the second resource by using the antenna #0 and the antenna

1 in the symbol 0 to the symbol 10, and send the SRS on the first resource by using the antenna #0 and the antenna #1 in the symbol 10 to the symbol 13.

Manner C:

Optionally, the method 300 further includes:

Step 3303: If all antennas in the second antenna group and at least one antenna in the first antenna group cannot be used for simultaneous transmission, or all antennas in the second antenna group and any one of antennas in the first antenna group cannot be used for simultaneous transmission, the terminal device does not send the second signal or the second channel on the second resource.

Figure 8:
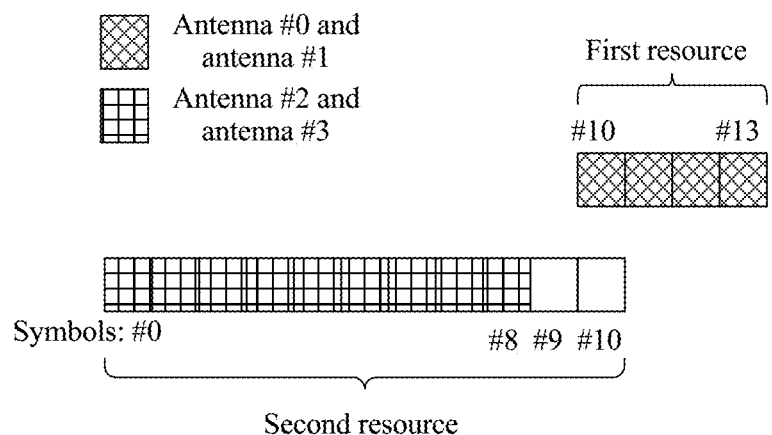
FIG. 8 is still another schematic diagram in which a terminal device sends a first signal or a first channel and a second signal or a second channel.

For example, it is assumed that the first antenna group used to transmit the SRS includes an antenna #0 and an antenna #1, the second antenna group used to transmit the PUSCH includes an antenna #2 and an antenna #3, the antenna #0 and the antenna #2 cannot be used for simultaneous transmission, and the antenna #1 and the antenna #3 cannot be used for simultaneous transmission. As shown in FIG. 8, in the symbol 9 and the symbol 10, the terminal device cannot send the PUSCH on the second resource by using the antenna #2 and the antenna #3. In this case, the terminal device may send the PUSCH on the second resource by using the antenna #2 and the antenna #3 in the symbol 0 to the symbol 8, may not send the PUSCH in the symbol 9 and the symbol 10, and may send the SRS on the first resource by using the antenna #0 and the antenna #1 in the symbol 10 to the symbol 13.

Figure 9:
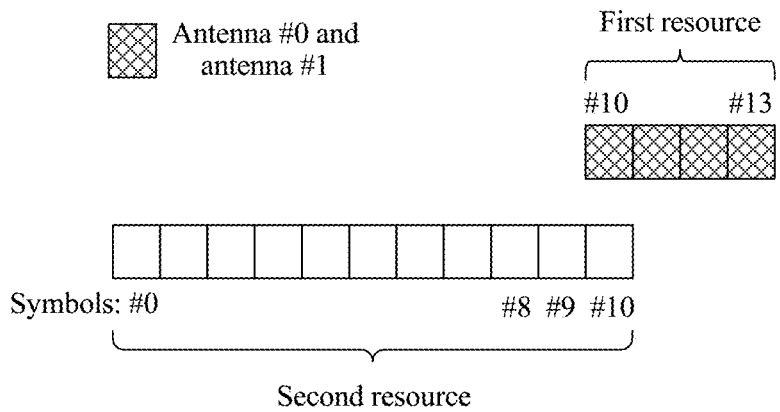
FIG. 9 is yet another schematic diagram in which a terminal device sends a first signal or a first channel and a second signal or a second channel.

Alternatively, as shown in FIG. 9, in the symbol 9 and the symbol 10, the terminal device cannot send the PUSCH on the second resource by using the antenna #2 and the antenna #3. In this case, the terminal device does not send the second signal or the second channel, and sends the SRS on the first resource by using the antenna #0 and the antenna #1 in the symbol 10 to the symbol 13.

Optionally, the foregoing method may be applied to only a part (for example, the symbol 10 shown in FIG. 4 to FIG. 9) in which the first resource overlaps with the second resource in time domain, and a part (for example, the symbol 9 shown in FIG. 4 to FIG. 9) that is in the second resource and in which a time interval between the second resource and the first resource is less than Y. For example, the part in which the second resource overlaps with the first resource in time domain and the part that is in the second resource and in which the time interval between the second resource and the first resource is less than Y are denoted as a first part of the second resource, and a resource in the second resource except the first part of the second resource is normally used for sending based on configuration of the second channel or the second signal.

In Manner A, if at least some antennas in the second antenna group and any one of antennas in the first antenna group can be used for simultaneous transmission, the terminal device sends the second signal or the second channel on the first part of the second resource by using at least some antennas in the second antenna group.

In Manner B, the terminal device sends the second signal or the second channel on the overlapping resource of the second resource and the first resource by using at least some antennas in the first antenna group, and does not send the second signal or the second channel by using at least some antennas in the second antenna group or all antennas in the second antenna group on the part that is in the second resource and in which the time interval between the second resource and the first resource is less than Y.

In Manner C, if all antennas in the second antenna group and any one of antennas in the first antenna group cannot be used for simultaneous transmission, or all antennas in the second antenna group and at least one antenna in the first antenna group cannot be used for simultaneous transmission, the terminal device does not send the second signal or the second channel on the first part of the second resource.

In a possible design, a priority of the SRS is higher than a priority of the PUSCH, and a priority of a PUCCH is higher than the priority of the SRS.

It should be understood that the terminal device may send the second signal or the second channel in another manner, to avoid a case in which the second signal or the second channel is sent by using an antenna that cannot be used for simultaneous transmission with an antenna in the first antenna group in the guard period. The foregoing enumerated method is merely an example for description, and should not constitute any limitation on this application.

According to the foregoing method, when the terminal device transmits a signal or a channel by using different antenna groups, it can be ensured that a time interval between different resources is greater than or equal to a time length of a guard period, thereby ensuring signal receiving quality and improving performance of the terminal device.

It should be noted that the foregoing method can not only be used to send an uplink signal or an uplink channel, but also be used to receive a downlink signal or a downlink channel. When the foregoing method is used to receive a downlink signal or a downlink channel, a transmit antenna in the foregoing method 300 may be replaced with a receive antenna.

With reference to FIG. 10 to FIG. 16, the following describes in detail a signal sending and receiving method according to another embodiment of this application.

In this embodiment of this application, to facilitate distinguishing from the uplink signal and the uplink channel described above, a downlink signal may be denoted as a third signal or a fourth signal, and a downlink channel may be denoted as a third channel or a fourth channel. It should be understood that the downlink signal may include but is not limited to a synchronization signal block (SSB), a CSI-RS, a DMRS, or a PTRS. The downlink channel may include but is not limited to a physical downlink shared channel (PDSCH) or a physical downlink control channel (PDCCH).

Figure 10:
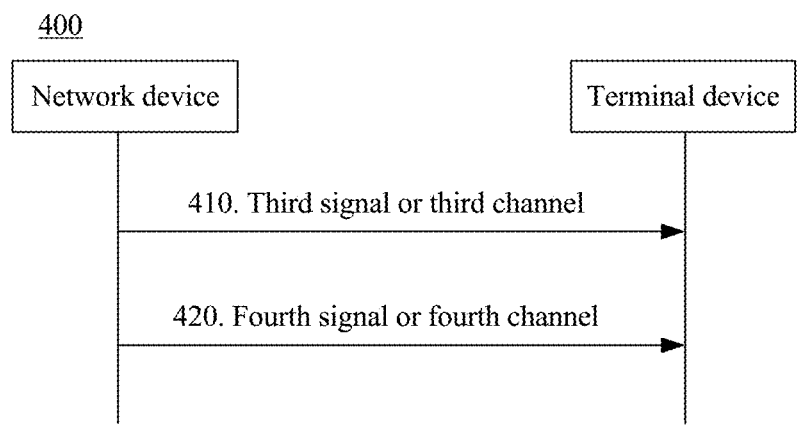
FIG. 10 is a schematic flowchart of a signal sending and receiving method according to still another embodiment of this application.

FIG. 10 is a schematic flowchart of a signal sending and receiving method 400 according to still another embodiment of this application from a perspective of interaction between devices. As shown in FIG. 10, the method 400 may include step 410 and step 420.

In step 410, a network device sends a third signal or a third channel on a third resource.

In step 420, the network device sends a fourth signal or a fourth channel on a fourth resource.

For example, a terminal device may determine, based on a PDCCH sent by the network device, a resource of a data signal sent by using a PDSCH and a resource of a DMRS. For another example, the network device may determine a resource of the PDCCH or a resource of the PDSCH based on a predefined resource. A specific method for determining, by the terminal device, the third resource for sending the third signal or the third channel and the fourth resource for sending the fourth signal or the fourth channel by the network device may be the same as that in the prior art, and is not limited in this application. In addition, the terminal device may further determine, by using, for example, the method provided in the foregoing method 200, an antenna group corresponding to a resource group. For example, an antenna group is configured by the network device or is predefined (for example, defined by a protocol). For brevity, detailed descriptions of the specific process are omitted herein.

In this embodiment of this application, if the third resource and the fourth resource occupy different first-type time units, and a time interval between the third resource and the fourth resource is greater than or equal to a time length of one guard period, the terminal device may receive the third signal or the third channel on the third resource by using a third antenna group and receive the fourth signal or the fourth channel on the fourth resource by using a fourth antenna group in the foregoing antenna switching manner.

Correspondingly, in step 410, the terminal device may receive the third signal or the third channel on the third resource by using a preconfigured antenna group (for example, denoted as the third antenna group) that is used to receive the third signal or the third channel.

In step 420, the terminal device may receive the fourth signal or the fourth channel on the fourth resource by using a preconfigured antenna group (for example, denoted as the fourth antenna group) that is used to receive the fourth signal or the fourth channel.

If the third resource overlaps with the fourth resource in time domain, and a time interval between the third resource and the fourth resource is less than a time length of one guard period, when data is received on the overlapping time domain resource or in the time interval less than one guard period, receiving quality of the data may deteriorate. In this case, the terminal device may receive a signal or a channel by using the method provided in the foregoing method 300.

The time length of one guard period may be represented or quantized as Z second-type time units. Herein, a meaning of Z may be similar to the meaning of Y in the foregoing method 300, and determining manners are also similar. In this embodiment, a different letter is defined only for distinguishing between an uplink and a downlink. Therefore, this should not constitute any limitation on this application.

Correspondingly, in step 410, the terminal device receives the third signal or the third channel on the third resource, or the terminal device does not receive the third signal or the third channel.

In step 420, the terminal device receives the fourth signal or the fourth channel on the fourth resource by using the fourth antenna group.

For ease of understanding, the following separately describes in detail a process in which the terminal device receives the third signal or the third channel on the third resource by using the third antenna group and a process in which the terminal device receives the fourth signal or the fourth channel on the fourth resource by using the fourth antenna group with reference to the accompanying drawings.

Specifically, the terminal device may process the third signal or the third channel in any one of the following manners:

Manner D: The terminal device receives the third signal or the third channel on the third resource by using at least some antennas in the third antenna group.

Manner E: The terminal device receives the third signal or the third channel on the third resource by using at least some antennas in the fourth antenna group.

Manner F: The terminal device does not receive the third signal or the third channel on the third resource.

The following separately describes Manner D, Manner E, and Manner F in detail with reference to the accompanying drawings.

FIG. 11 to FIG. 16 are schematic diagrams in which the terminal device receives the third signal or the third channel and the fourth signal or the fourth channel. In the following examples shown with reference to FIG. 11 to FIG. 16, it is assumed that the third resource is located before the fourth resource in time domain, and a priority of the third signal or the third channel is lower than a priority of the fourth signal or the fourth channel. It is assumed that the third signal or the third channel is a PDSCH and is configured to be transmitted in a symbol 0 to a symbol 10, the fourth signal or the fourth channel is a reference signal (for example, a CSI-RS) used for channel measurement and is configured to be transmitted in the symbol 10 to a symbol 13, a second signal or a second channel is a PUSCH, a priority of the CSI-RS is higher than that of the PDSCH, a guard period includes one symbol, and the symbol 9 is the guard period.

Manner D:

Optionally, step 410 specifically includes:

if at least some antennas in the third antenna group and any one of antennas in the fourth antenna group can be used for simultaneous receiving, the terminal device receives the third signal or the fourth channel on the third resource by using at least some antennas in the third antenna group.

Figure 11:
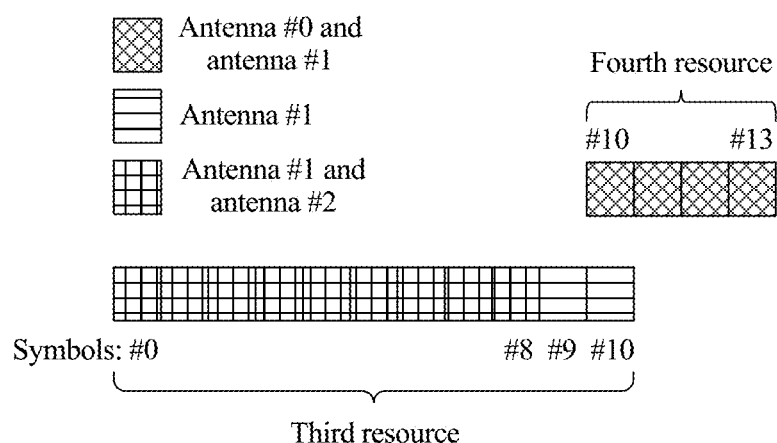
FIG. 11 is a schematic diagram in which a terminal device receives a third signal or a third channel and a fourth signal or a fourth channel.

For example, it is assumed that the fourth antenna group used to transmit the CSI-RS includes an antenna #0 and an antenna #1, the third antenna group used to transmit the PDSCH includes the antenna #1 and an antenna #2, and the antenna #0 and the antenna #2 cannot be used for simultaneous transmission. As shown in FIG. 11, in the symbol 9 and the symbol 10, the terminal device cannot receive the PDSCH on the third resource by using the antenna #1 and the antenna #2. In this case, the terminal device may receive the PDSCH on the third resource by using the antenna #1 and the antenna #2 in the symbol 0 to the symbol 8, receive the PDSCH on the third resource by using only the antenna #1 in the symbol 9 and the symbol 10, and receive the CSI-RS on the fourth resource by using the antenna #0 and the antenna #1 in the symbol 10 to the symbol 13.

Figure 12:
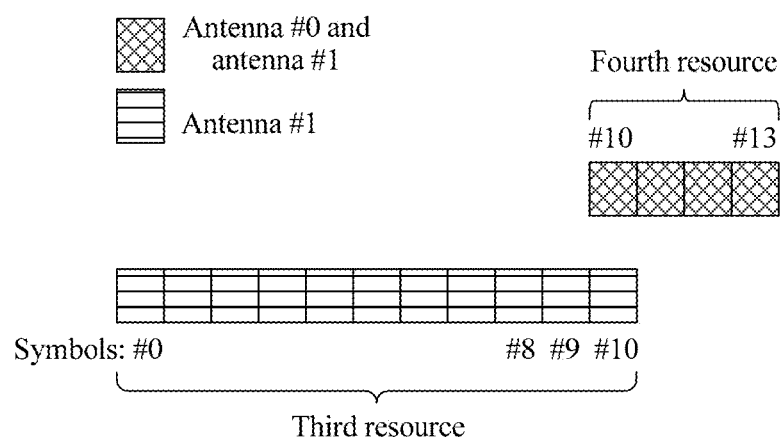
FIG. 12 is another schematic diagram in which a terminal device receives a third signal or a third channel and a fourth signal or a fourth channel.

Alternatively, as shown in FIG. 12, in the symbol 9 and the symbol 10, the terminal device cannot receive the PDSCH on the third resource by using the antenna #1 and the antenna #2. In this case, the terminal device receives the PDSCH on the third resource by using the antenna #1 in the symbol 0 to the symbol 10, and receives the CSI-RS on the fourth resource by using the antenna #0 and the antenna #1 in the symbol 10 to the symbol 13.

Manner E:

Optionally, step 410 specifically includes:

the terminal device receives the third signal or the third channel on the third resource by using at least some antennas in the fourth antenna group.

Figure 13:
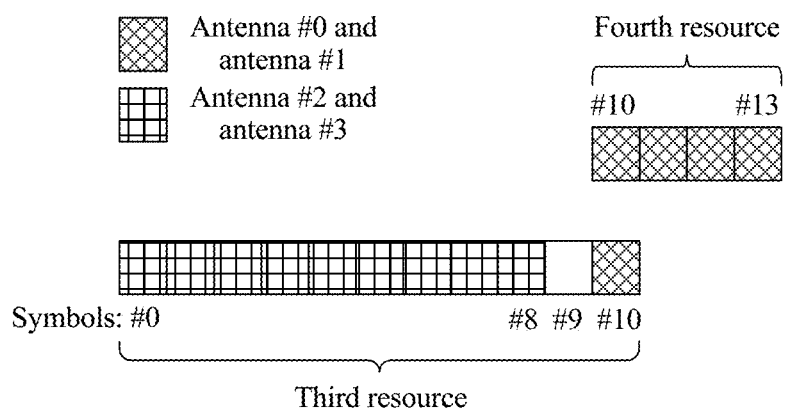
FIG. 13 is still another schematic diagram in which a terminal device receives a third signal or a third channel and a fourth signal or a fourth channel.

For example, it is assumed that the fourth antenna group used to transmit the CSI-RS includes an antenna #0 and an antenna #1, the third antenna group used to transmit the PDSCH includes an antenna #2 and an antenna #3, the antenna #0 and the antenna #2 cannot be used for simultaneous transmission, and the antenna #1 and the antenna #3 cannot be used for simultaneous transmission. As shown in FIG. 13, in the symbol 9 and the symbol 10, the terminal device cannot receive the PDSCH on the third resource by using the antenna #2 and the antenna #3. In this case, the terminal device may receive the PDSCH on the third resource by using the antenna #2 and the antenna #3 in the symbol 0 to the symbol 8, perform antenna switching but do not receive the PDSCH in the symbol 9, receive the PDSCH on the third resource by using the antenna #0 and the antenna

1 in the symbol 10, and receive the CSI-RS on the fourth resource by using the antenna #0 and the antenna #1 in the symbol 10 to the symbol 13.

Figure 14:
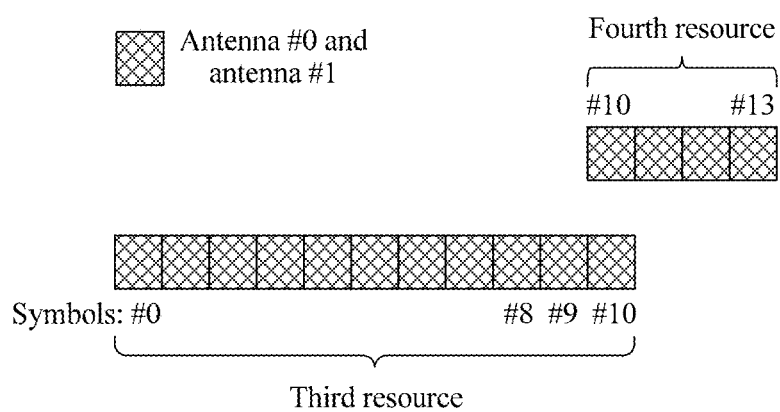
FIG. 14 is yet another schematic diagram in which a terminal device receives a third signal or a third channel and a fourth signal or a fourth channel.

Alternatively, as shown in FIG. 14, in the symbol 9 and the symbol 10, the terminal device cannot receive the PDSCH on the third resource by using the antenna #2 and the antenna #3. In this case, the terminal device may receive the PDSCH on the third resource by using the antenna #0 and the antenna #1 in the symbol 0 to the symbol 10, and receive the CSI-RS on the fourth resource by using the antenna #0 and the antenna #1 in the symbol 10 to the symbol 13.

Manner F:

Optionally, step 410 specifically includes:

if all antennas in the third antenna group and at least one antenna in the fourth antenna group cannot be used for simultaneous transmission, or all antennas in the third antenna group and any one of antennas in the fourth antenna group cannot be used for simultaneous transmission, the terminal device does not receive the third signal or the third channel on the third resource.

Figure 15:
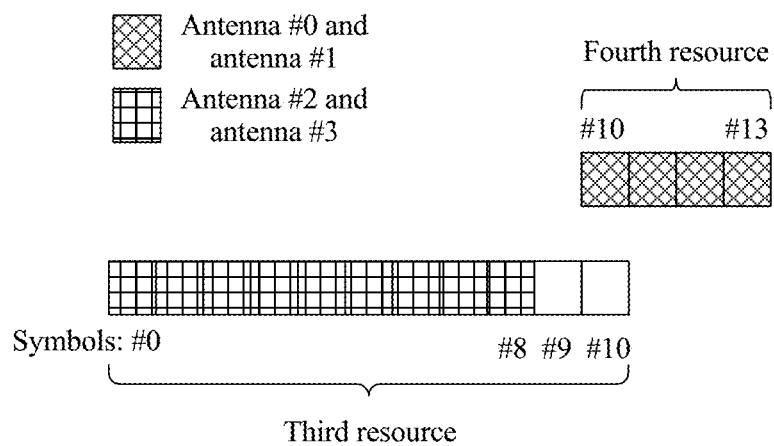
FIG. 15 is still another schematic diagram in which a terminal device receives a third signal or a third channel and a fourth signal or a fourth channel.

For example, it is assumed that the fourth antenna group used to transmit the CSI-RS includes an antenna #0 and an antenna #1, the third antenna group used to transmit the PDSCH includes an antenna #2 and an antenna #3, the antenna #0 and the antenna #2 cannot be used for simultaneous transmission, and the antenna #1 and the antenna #3 cannot be used for simultaneous transmission. As shown in FIG. 15, in the symbol 9 and the symbol 10, the terminal device cannot receive the PDSCH on the third resource by using the antenna #2 and the antenna #3. In this case, the terminal device may receive the PDSCH on the third resource by using the antenna #2 and the antenna #3 in the symbol 0 to the symbol 8, do not receive the PDSCH in the symbol 9 and the symbol 10, and receive the CSI-RS on the fourth resource by using the antenna #0 and the antenna #1 in the symbol 10 to the symbol 13.

Figure 16:
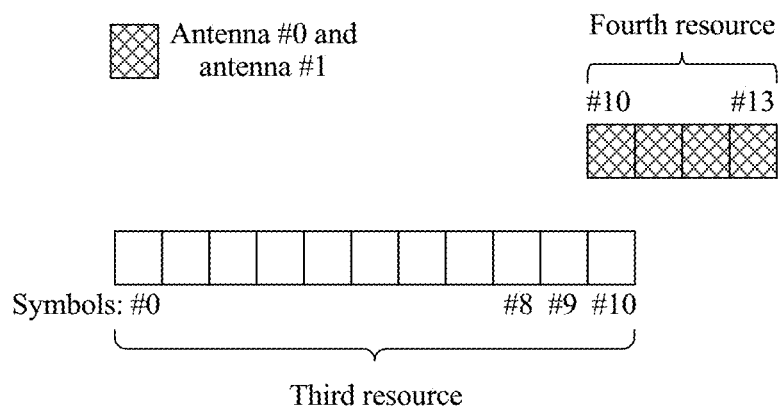
FIG. 16 is yet another schematic diagram in which a terminal device receives a third signal or a third channel and a fourth signal or a fourth channel.

Alternatively, as shown in FIG. 16, in the symbol 9 and the symbol 10, the terminal device cannot receive the PDSCH on the third resource by using the antenna #2 and the antenna #3. In this case, the terminal device directly does not receive the second signal or the second channel, and receives the CSI-RS on the fourth resource by using the antenna #0 and the antenna #1 in the symbol 10 to the symbol 13.

Optionally, the foregoing method may be applied to only a part (for example, the symbol 10 shown in FIG. 11 to FIG. 16) in which the fourth resource overlaps with the third resource in time domain, and a part (for example, the symbol 9 shown in FIG. 11 to FIG. 16) that is in the third resource and in which a time interval between the third resource and the fourth resource is less than Z. For example, the part in which the third resource overlaps with the fourth resource in time domain and the part that is in the third resource and in which the time interval between the third resource and the fourth resource is less than Z are denoted as a first part of the third resource, and a resource in the third resource except the first part of the third resource is normally used for receiving based on configuration of the second channel or the second signal.

In Manner D, if at least some antennas in the third antenna group and any one of antennas in the fourth antenna group can be used for simultaneous transmission, the terminal device receives the third signal or the third channel on the first part of the third resource by using at least some antennas in the third antenna group.

In Manner E, the terminal device receives the third signal or the third channel on the overlapping resource of the third resource and the fourth resource by using at least some antennas in the fourth antenna group, and does not receive the third signal or the third channel by using at least some antennas in the third antenna group or all antennas in the third antenna group on the part that is in the third resource and in which the time interval between the third resource and the fourth resource is less than Z.

In Manner F, if all antennas in the third antenna group and any one of antennas in the fourth antenna group cannot be used for simultaneous transmission, or all antennas in the third antenna group and at least one antenna in the fourth antenna group cannot be used for simultaneous transmission, the terminal device does not receive the third signal or the third channel on the first part of the third resource.

In a possible design, a priority of the CSI-RS is higher than a priority of the PDSCH, and a priority of a PDCCH is higher than the priority of the CSI-RS.

It should be understood that the terminal device may receive the third signal or the third channel in another manner, to avoid a case in which the third signal or the third channel is received by using an antenna that cannot be used for simultaneous transmission with an antenna in the fourth antenna group in the guard period. The foregoing enumerated method is merely an example for description, and should not constitute any limitation on this application.

According to the foregoing method, when the terminal device transmits a signal or a channel by using different antenna groups, it can be ensured that a time interval between different resources is greater than or equal to a time length of a guard period, thereby ensuring signal receiving quality and improving performance of the terminal device.

It should be understood that information or configuration information sent by the network device in this application may be transmitted by using one piece of signaling or a plurality of pieces of signaling. The signaling may be carried in RRC signaling, MAC CE signaling, or DCI. For the transmission by using the plurality of pieces of signaling, indication information or configuration information may be divided into a plurality of parts, and each part is transmitted by using one piece of signaling. Alternatively, one piece of signaling may be first used to configure a candidate set of indication information or configuration information, and another piece of signaling is used to indicate one piece of information in the candidate set. Alternatively, one piece of signaling may be first used to configure a candidate set of indication information or configuration information, a second piece of signaling is used to indicate a subset of the candidate set, and then a third piece of signaling is used to indicate one piece of information in the subset of the candidate set. Optionally, the indication information or the configuration information may be configured by combining the foregoing plurality of methods.

It should be understood that in embodiments of this application, the first, the second, the third, the fourth, and the fifth are merely used to distinguish between different objects, and should not constitute any limitation on this application. For example, the first, the second, the third, the fourth, and the fifth are used to distinguish between different SRS resource groups, different resources, different antenna groups, different signals, different channels, and different information.

It should be further understood that the "predefinition" described above may be implemented by prestoring corresponding code or a table in devices (for example, including the terminal device and the network device) or in another manner of indicating related information. A specific implementation of the foregoing "predefinition" is not limited in this application.

Methods provided in embodiments of this application are described above in detail with reference to FIG. 2 to FIG. 16. Apparatuses provided in embodiments of this application are described below in detail with reference to FIG. 17 to FIG. 20.

Figure 17:
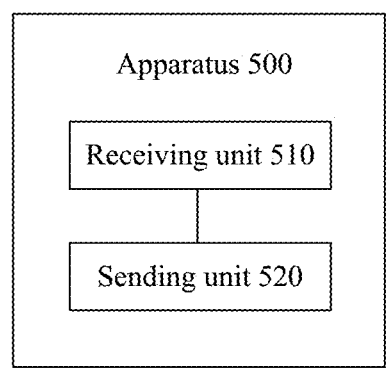
FIG. 17 is a schematic block diagram of a signal sending apparatus according to an embodiment of this application.

FIG. 17 is a schematic block diagram of a signal sending apparatus 500 according to an embodiment of this application. As shown in FIG. 17, the apparatus 500 may include a receiving unit 510 and a sending unit 520.

The receiving unit 510 is configured to receive at least one piece of resource configuration information, where the at least one piece of resource configuration information is used to determine N reference signal resource groups, and each of the N reference signal resource groups includes at least one reference signal resource.

The sending unit 520 is configured to send a reference signal on a resource in an $i^{th}$ reference signal resource group in the N reference signal resource groups by using a $j^{th}$ antenna group corresponding to the $i^{th}$ reference signal resource group, where the $j^{th}$ antenna group includes at least one antenna.

At least two of the N reference signal resource groups occupy different first-type time units, the N reference signal resource groups correspond to N antenna groups, and at least two of the N antenna groups are different, where $1 \leq i \leq N$, $1 \leq j \leq N$, i and j are integers, and N is an integer greater than or equal to 2.

It should be understood that the apparatus 500 may correspond to the terminal device in the signal sending and receiving method 200 in embodiments of this application. The apparatus 500 may include modules configured to perform the method performed by the terminal device in the signal sending and receiving method 200 in FIG. 2. In addition, the modules in the apparatus 500 and the foregoing other operations and/or functions are separately intended to implement corresponding procedures of the signal sending and receiving method 200 in FIG. 2. Exemplary processes of performing the foregoing corresponding steps by the modules are described in detail in the method 200. For brevity, details are not described herein again.

Alternatively, the apparatus 500 may correspond to the terminal device in the signal sending and receiving method 300 in embodiments of this application. The apparatus 500 may include modules configured to perform the method performed by the terminal device in the signal sending and receiving method 300 in FIG. 3. In addition, the modules in the apparatus 500 and the foregoing other operations and/or functions are separately intended to implement corresponding procedures of the signal sending and receiving method 300 in FIG. 3. Exemplary processes of performing the foregoing corresponding steps by the modules are described in detail in the method 300. For brevity, details are not described herein again.

Alternatively, the apparatus 500 may correspond to the terminal device in the signal sending and receiving method 400 in embodiments of this application. The apparatus 500 may include modules configured to perform the method performed by the terminal device in the signal sending and receiving method 400 in FIG. 10. In addition, the modules in the apparatus 500 and the foregoing other operations and/or functions are separately intended to implement corresponding procedures of the signal sending and receiving method 400 in FIG. 10. Exemplary processes of performing the foregoing corresponding steps by the modules are described in detail in the method 400. For brevity, details are not described herein again.

Figure 18:
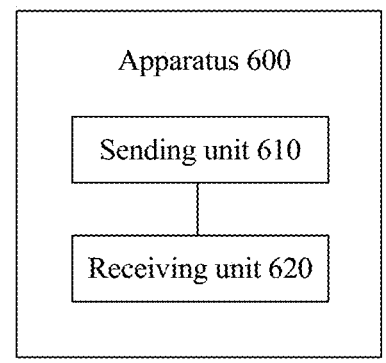
FIG. 18 is a schematic block diagram of a signal receiving apparatus according to an embodiment of this application.

FIG. 18 is a schematic block diagram of a signal receiving apparatus 600 according to an embodiment of this application. As shown in FIG. 18, the apparatus 600 may include a sending unit 610 and a receiving unit 620.

The sending unit 610 is configured to send at least one piece of resource configuration information, where the at least one piece of resource configuration information is used to determine N reference signal resource groups, and each of the N reference signal resource groups includes at least one reference signal resource.

The receiving unit 620 is configured to receive a reference signal from a $j^{th}$ antenna group on a resource in an $i^{th}$ reference signal resource group in the N reference signal resource groups, where the $j^{th}$ antenna group includes at least one antenna.

At least two of the N reference signal resource groups occupy different first-type time units, the N reference signal resource groups correspond to N antenna groups, and at least two of the N antenna groups are different, where $1 \leq i \leq N$, $1 \leq j \leq N$, i and j are integers, and N is an integer greater than or equal to 2.

It should be understood that the apparatus 600 may correspond to the network device in the signal sending and receiving method 200 in embodiments of this application. The apparatus 600 may include modules configured to perform the method performed by the network device in the signal sending and receiving method 200 in FIG. 2. In addition, the modules in the apparatus 600 and the foregoing other operations and/or functions are separately intended to implement corresponding procedures of the signal sending and receiving method 200 in FIG. 2. Exemplary processes of performing the foregoing corresponding steps by the modules are described in detail in the method 200. For brevity, details are not described herein again.

Alternatively, the apparatus 600 may correspond to the network device in the signal sending and receiving method 300 in embodiments of this application. The apparatus 600 may include modules configured to perform the method performed by the network device in the signal sending and receiving method 300 in FIG. 3. In addition, the modules in the apparatus 600 and the foregoing other operations and/or functions are separately intended to implement corresponding procedures of the signal sending and receiving method 300 in FIG. 3. Exemplary processes of performing the foregoing corresponding steps by the modules are described in detail in the method 300. For brevity, details are not described herein again.

Alternatively, the apparatus 600 may correspond to the network device in the signal sending and receiving method 400 in embodiments of this application. The apparatus 600 may include modules configured to perform the method performed by the network device in the signal sending and receiving method 400 in FIG. 10. In addition, the modules in the apparatus 600 and the foregoing other operations and/or functions are separately intended to implement corresponding procedures of the signal sending and receiving method 400 in FIG. 10. Exemplary processes of performing the foregoing corresponding steps by the modules are described in detail in the method 400. For brevity, details are not described herein again.

Figure 19:
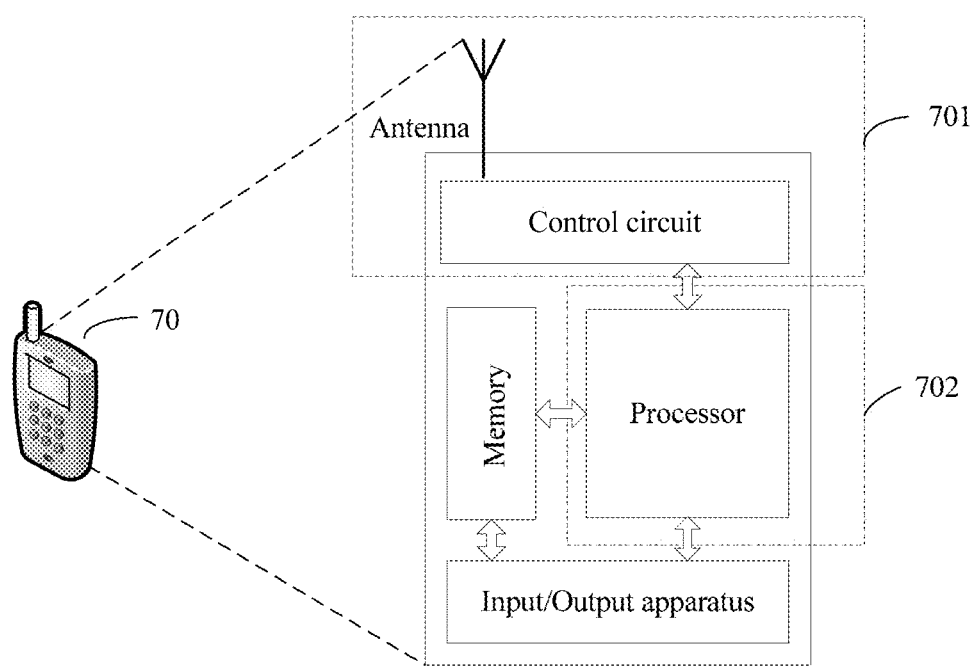
FIG. 19 is a schematic structural diagram of a terminal device according to an embodiment of this application.

FIG. 19 is a schematic structural diagram of a terminal device according to an embodiment of this application. The terminal device may be applied to the system shown in FIG. 1, and performs a function of the terminal device in the foregoing method embodiment. For ease of description, FIG. 19 shows exemplary components of the terminal device. As shown in FIG. 19, a terminal device 70 includes a processor, a memory, a control circuit, an antenna, and an input/output apparatus. The processor is configured to: process a communication protocol and communication data, control the entire terminal device, execute a software program, and process data of the software program. For example, the processor is configured to support the terminal device in performing an action described in the foregoing method embodiment, for example, determining a $j^{th}$ antenna group corresponding to an $i^{th}$ reference signal resource group in N reference signal resource groups. The memory is configured to store the software program and the data, for example, store a correspondence between antenna groups and reference signal resources described in the foregoing embodiment. The control circuit is configured to: perform conversion between a baseband signal and a radio frequency signal, and process the radio frequency signal. A combination of the control circuit and the antenna may also be referred to as a transceiver that is configured to send/receive a radio frequency signal in an electromagnetic wave form. The input/output apparatus such as a touchscreen, a display screen, or a keyboard is configured to: receive data entered by a user, and output data to the user.

After the terminal device is powered on, the processor may read the software program in the memory, explain and execute an instruction of the software program, and process the data of the software program. When the processor needs to send data by using the antenna, after performing baseband processing on the to-be-sent data, the processor outputs a baseband signal to a radio frequency circuit. After performing radio frequency processing on the baseband signal, the radio frequency circuit sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 19 shows only one memory and only one processor. An actual terminal device may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is configured to process the communication protocol and the communication data, and the central processing unit is configured to: control the entire terminal device, execute the software program, and process the data of the software program. Functions of the baseband processor and the central processing unit may be integrated into the processor in FIG. 19. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be embedded in the processor, or may be stored in the storage unit in a form of a software program. The processor executes the software program to implement a baseband processing function.

In this embodiment of this application, the antenna and the control circuit that have a sending/receiving function may be considered as a transceiver unit 701 of the terminal device 70. For example, the transceiver unit 701 is configured to support the terminal device in executing the receiving function and the sending function described in FIG. 2, FIG. 3, or FIG. 10. The processor that has a processing function is considered as a processing unit 702 of the terminal device 70. As shown in FIG. 19, the terminal device 70 includes the transceiver unit 701 and the processing unit 702. The transceiver unit may also be referred to as a transceiver, a transceiver apparatus, or the like. Optionally, a component that is in the transceiver unit 701 and that is configured to implement a receiving function may be considered as a receiving unit, and a component that is in the transceiver unit 701 and that is configured to implement a sending function may be considered as a sending unit. In other words, the transceiver unit 701 includes the receiving unit and the sending unit. The receiving unit may also be referred to as a receiver, an input port, a receiver circuit, or the like, and the sending unit may be referred to as a transmitter, a transmitter circuit, or the like.

The processor 702 may be configured to execute an instruction stored in the memory, to control the transceiver unit 701 to receive a signal and/or send a signal, thereby completing the function of the terminal device in the foregoing method embodiment. In an implementation, a function of the transceiver unit 701 may be implemented by using a transceiver circuit or a dedicated transceiver chip.

Figure 20:
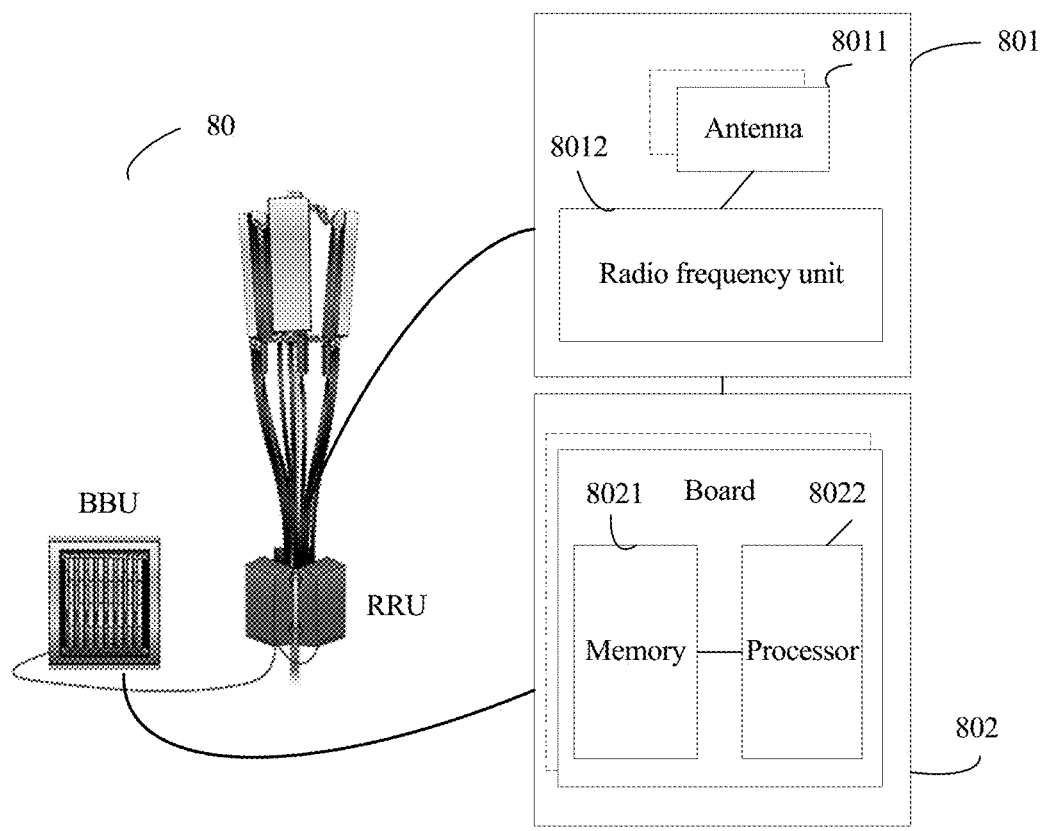
FIG. 20 is a schematic structural diagram of a network device according to an embodiment of this application.

FIG. 20 is a schematic structural diagram of a network device according to an embodiment of this application, for example, may be a schematic structural diagram of a base station. As shown in FIG. 20, the base station may be applied to the system shown in FIG. 1, and implements a function of the network device in the foregoing method embodiment. A base station 80 may include one or more radio frequency units such as a remote radio unit (RRU) 801 and one or more baseband units (BBU) (which may also be referred to as a digital unit (DU)) 802. The RRU 801 may be referred to as a transceiver unit, a transceiver, a transceiver circuit, a transceiver, or the like, and the RRU 801 may include at least one antenna 8011 and a radio frequency unit 8012. The RRU 801 is configured to send/receive a radio frequency signal and perform conversion between a radio frequency signal and a baseband signal, for example, configured to send a signaling message in the foregoing embodiment to a terminal device. The BBU 802 is configured to perform baseband processing, control the base station, and the like. The RRU 801 and the BBU 802 may be physically disposed together, or may be physically disposed separately, in other words, the base station 80 is a distributed base station.

The BBU 802 is a control center of the base station, may also be referred to as a processing unit, and is configured to implement a baseband processing function such as channel coding, multiplexing, modulation, and spreading. For example, the BBU (the processing unit) 802 may be configured to control the base station to perform operation procedures related to the network device in the foregoing method embodiment.

In an example, the BBU 802 may include one or more boards, and a plurality of boards may jointly support a radio access network (for example, an LTE network) of a single access standard, or may separately support radio access networks (such as an LTE network, a 5G network, or another network) of different access standards. The BBU 802 further includes a memory 8021 and a processor 8022, and the memory 8021 is configured to store necessary instructions and data. For example, the memory 8021 stores a correspondence between a codebook index and a precoding matrix in the foregoing embodiment. The processor 8022 is configured to control the base station to perform a necessary action. For example, the processor 8022 is configured to control the base station to perform the operation procedures related to the network device in the foregoing method embodiment. The memory 8021 and the processor 8022 may serve the one or more boards. In other words, a memory and a processor may be disposed separately on each board, or a plurality of boards may share a same memory and a same processor. In addition, a necessary circuit may be further disposed on each board.

This application further provides a communications system. The communications system includes the foregoing one or more network devices and the foregoing one or more terminal devices.

It should be understood that, the processor in embodiments of this application may be a central processing unit (CPU), or the processor may be another general purpose processor, a digital signal processor (DSP), an application-specific integrated circuit (ASIC), a field programmable gate array (FPGA), another programmable logic device, a discrete gate, a transistor logic device, a discrete hardware component, or the like. The general purpose processor may be a microprocessor, or the processor may be any conventional processor or the like.

It should be further understood that the memory in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through examples but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

All or some of the foregoing embodiments may be implemented by using software, hardware, firmware, or any combination thereof. When software is used to implement embodiments, all or some of the foregoing embodiments may be implemented in a form of a computer program product. The computer program product includes one or more computer instructions or computer programs. When the computer instructions or computer programs are loaded and executed on a computer, the procedures or functions in embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, a computer, a server, or a data center to another website, another computer, another server, or another data center in a wired (for example, infrared, radio, or microwave) manner. The computer readable storage medium may be any usable medium accessible by the computer, or may be a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not necessarily mean execution sequences in embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve objectives of solutions of embodiments.

In addition, functional units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer readable storage medium. Based on such an understanding, technical solutions of this application may be implemented in a form of a software product. The computer software product is stored in a storage medium, and includes several instructions for instructing a computer device (which may be a personal computer, a server, or a network device) to perform all or some of the steps of the methods in embodiments of this application. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing descriptions are merely exemplary implementations of this application, but are not intended to limit the protection scope of this application. Any variation or replacement readily figured out by a person skilled in the art within the technical scope disclosed in this application may fall within the protection scope of this application.

What is claimed is:

1. A signal receiving method, comprising:
    sending at least one piece of resource configuration information for configuring at least one sounding reference signal (SRS) resource set, wherein each SRS resource set of the at least one SRS resource set comprises one or more SRS resources, and wherein different SRS resources comprised in a same SRS resource set occupy different symbols and correspond to different user equipment (UE) antenna ports; and
    receiving an SRS on at least one SRS resource of the at least one SRS resource set;
    wherein a guard period between two SRS resources in a same SRS resource set is greater than or equal to Y symbols, wherein the value of Y and a subcarrier spacing satisfy at least one of:
        the value of Y is 1 and the subcarrier spacing is 15 kHz;
        the value of Y is 1 and the subcarrier spacing is 30 kHz;
        the value of Y is 1 and the subcarrier spacing is 60 kHz; or
        the value of Y is 2 and the subcarrier spacing is 120 kHz.

2. The method according to claim 1, wherein the method further comprises:
    sending at least one piece of first information for indicating whether SRSs to be transmitted on all SRS resources in one SRS resource set are to be sent in an antenna switching manner.

3. The method according to claim 1, wherein the method further comprises:
    sending at least one piece of first information for indicating whether SRSs are used to measure a channel for antenna selection.

4. The method according to claim 1, wherein the subcarrier spacing is a subcarrier spacing for the SRS, and wherein the value of Y is based on the subcarrier spacing for the SRS.

5. An apparatus, comprising:
    one or more processors, and
    a non-transitory storage medium configured to store program instructions;
    wherein the program instructions, when executed by the one or more processors, facilitate:
    sending, by the apparatus, at least one piece of resource configuration information for configuring at least one sounding reference signal (SRS) resource set, wherein each SRS resource set of the at least one SRS resource set comprises one or more SRS resources, and wherein different SRS resources comprised in a same SRS resource set occupy different symbols and correspond to different user equipment (UE) antenna ports; and
    receiving, by the apparatus, an SRS on at least one SRS resource of the at least one SRS resource set;
    wherein a guard period between two SRS resources in a same SRS resource set is greater than or equal to Y symbols, wherein the value of Y and a subcarrier spacing satisfy at least one of:
        the value of Y is 1 and the subcarrier spacing is 15 kHz;
        the value of Y is 1 and the subcarrier spacing is 30 kHz;
        the value of Y is 1 and the subcarrier spacing is 60 kHz; or
        the value of Y is 2 and the subcarrier spacing is 120 kHz.

6. The apparatus according to claim 5, wherein the program instructions, when executed by the one or more processors, further facilitate:
    sending, by the apparatus, at least one piece of first information for indicating whether SRSs to be transmitted on all SRS resources in one SRS resource set are to be sent in an antenna switching manner.

7. The apparatus according to claim 5, wherein the program instructions, when executed by the one or more processors, further facilitate:
    sending, by the apparatus, at least one piece of first information for indicating whether SRSs are used to measure a channel for antenna selection.

8. The apparatus according to claim 5, wherein the subcarrier spacing is a subcarrier spacing for the SRS, and wherein the value of Y is based on the subcarrier spacing for the SRS.

9. A non-transitory computer-readable medium having program instructions stored thereon, wherein, the program instructions, when executed by a processor of a network device, facilitate:
    sending at least one piece of resource configuration information for configuring at least one sounding reference signal (SRS) resource set, wherein each SRS resource set of the at least one SRS resource set comprises one or more SRS resources, and wherein different SRS resources comprised in a same SRS resource set occupy different symbols and correspond to different user equipment (UE) antenna ports; and
    receiving an SRS on at least one SRS resource of the at least one SRS resource set;
    wherein a guard period between two SRS resources in a same SRS resource set is greater than or equal to Y symbols, wherein the value of Y and a subcarrier spacing satisfy at least one of:
        the value of Y is 1 and the subcarrier spacing is 15 kHz;
        the value of Y is 1 and the subcarrier spacing is 30 kHz;

the value of Y is 1 and the subcarrier spacing is 60 kHz; or the value of Y is 2 and the subcarrier spacing is 120 kHz.

10. The non-transitory computer-readable medium according to claim 9, wherein the instructions, when executed by the processor of the network device, further facilitate:

sending at least one piece of first information for indicating whether SRSs to be transmitted on all SRS resources in one SRS resource set are to be sent in an antenna switching manner.

11. The non-transitory computer-readable medium according to claim 9, wherein the instructions, when executed by the processor of the network device, further facilitate:

sending at least one piece of first information for indicating whether SRSs are used to measure a channel for antenna selection.

12. The non-transitory computer-readable medium according to claim 9, wherein the subcarrier spacing is a subcarrier spacing for the SRS, and wherein the value of Y is based on the subcarrier spacing for the SRS.

* * * * *